(12) United States Patent
Date

(10) Patent No.: US 7,609,796 B2
(45) Date of Patent: Oct. 27, 2009

(54) COMMUNICATION CONTROL APPARATUS AND A METHOD FOR FREELY CONTROLLING THE TRANSMISSION OF TIME SLOTS

(75) Inventor: Masaaki Date, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 352 days.

(21) Appl. No.: 11/812,430

(22) Filed: Jun. 19, 2007

(65) Prior Publication Data
US 2007/0291796 A1    Dec. 20, 2007

(30) Foreign Application Priority Data
Jun. 20, 2006    (JP)    ............................. 2006-170485

(51) Int. Cl.
*H04L 7/00*    (2006.01)
(52) U.S. Cl. .................. 375/356; 375/362; 375/371; 375/373; 370/498
(58) Field of Classification Search ............. None
See application file for complete search history.

(56) References Cited

U.S. PATENT DOCUMENTS

2005/0190796 A1*  9/2005  Date et al. ............... 370/503
2006/0050826 A1*  3/2006  Date et al. ............... 375/362
2006/0114840 A1*  6/2006  Date et al. ............... 370/254
2006/0114841 A1*  6/2006  Date et al. ............... 370/254

FOREIGN PATENT DOCUMENTS

| JP | 2006-074617 | 3/2006 |
| JP | 2006-074619 | 3/2006 |

* cited by examiner

*Primary Examiner*—Pankaj Kumar
*Assistant Examiner*—Ajay P Cattungal
(74) *Attorney, Agent, or Firm*—Rabin & Berdo, P.C.

(57) ABSTRACT

A communication control apparatus includes a signal receiver for receiving a state variable signal indicating a timing of data transmission from a neighboring node. The apparatus also includes a calculator for forming a communication timing, by varying plural phase signals different in oscillation period in response to the state variable signal, synchronizing respective states of the phase signals so that they interact with each other, and temporally multiplexing plural data transmission periods different in time slot width and representing a transmission time period between its own node and the neighboring node based on respective oscillation periods of the phase signals. The calculator includes a state manager for managing states of phase signals for the own node and the neighboring node different in oscillation period, and prescribing an order relationship of time-slot allocation.

13 Claims, 12 Drawing Sheets

$t=t_0$ $t = t_0 + W_{i2}$ $t = t_0 + T_{i2}$

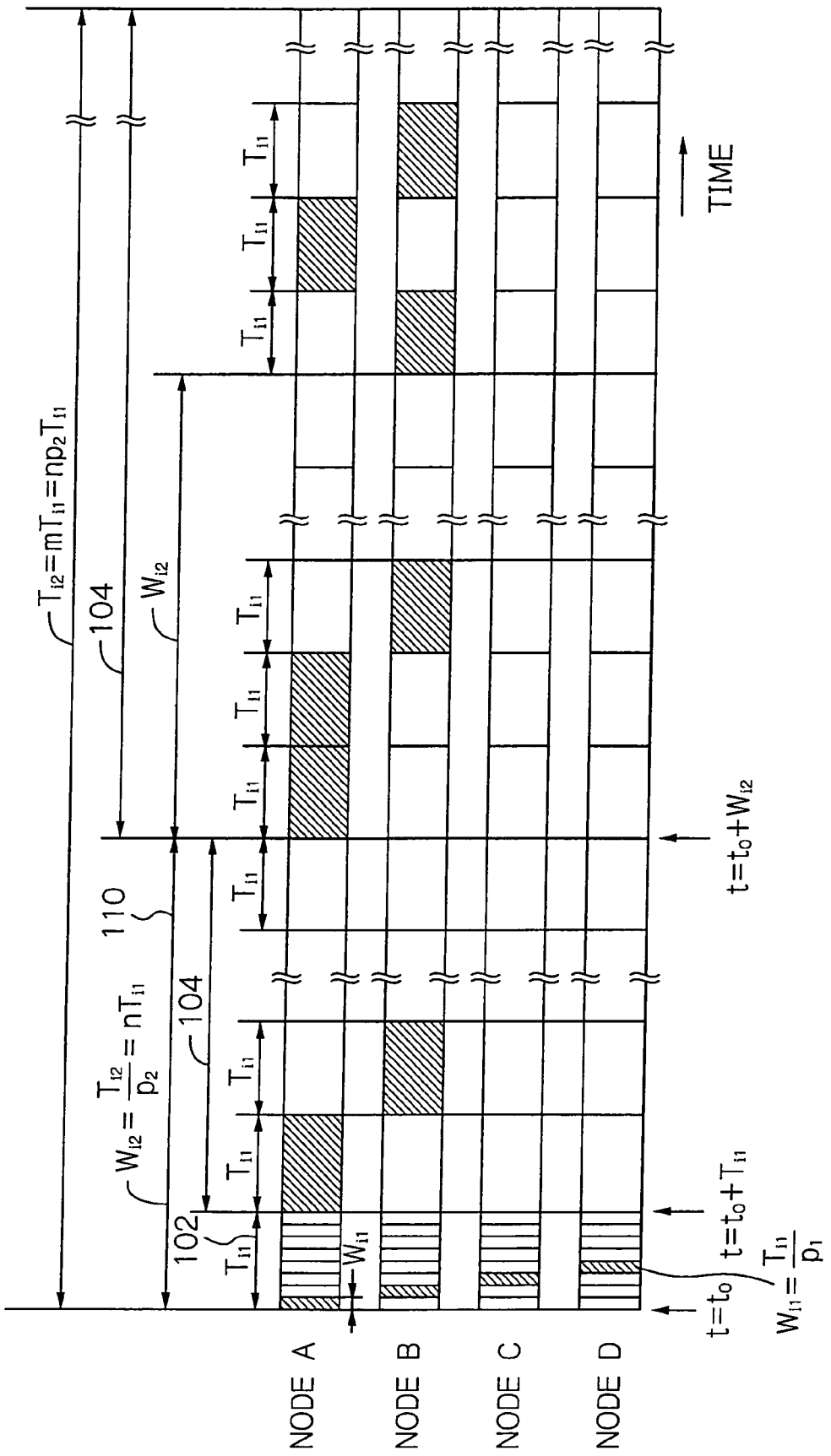

COMMUNICATION CONTROL APPARATUS AND A METHOD FOR FREELY CONTROLLING THE TRANSMISSION OF TIME SLOTS

BACKGROUND OF THE INVENTION

1. Field of the Invention

The present invention relates to a communication control apparatus and a method therefor, and more particularly to such an apparatus and a method for use in a system in which data is transmitted and received between a number of communication nodes spatially distributed or installed on mobile bodies, such as a system that is constituted by a plurality of communication devices connected to a sensor network or local area network (LAN).

2. Description of the Background Art

There are various methods for avoiding the collision of communication data, in which individual nodes allocate time slots autonomously without a central administrative server. Such methods are disclosed in U.S. Patent Application Publication Nos. US 2005/0190796 A1 to Date et al., US 2006/0114841 A1 to Date et al., and US 2006/0114840 A1 to Date et al., and Japanese Patent Laid-Open Publication Nos. 2006-074617 and 2006-074619, for example.

In these conventional methods, each node transmits and receives impulse signals periodically to and from its neighboring nodes, whereby communication timings are mutually adjusted. An impulse signal is a control signal indicating the transmission timing of its own node. This establishes time slot allocation, which divides one period during which an impulse signal is transmitted into sections approximately equal to each other, between nodes within an interaction range that impulse signals can reach. That is a telecommunications system in which the chances of transmission are equally given to each node within the interaction range. For instance, consider the case where three nodes A, B, and C lie within a sensor network. Node A establishes time-slot allocation, which approximately equally divides one oscillation period T, between itself and other nodes such as nodes B and C within the interaction range. If all nodes on networks operate in this manner, then it becomes possible to transmit sensing data from each node to a sink node with multiple hops. The sensing data is of a data signal that is transmitted in a time slot.

In the case of employing the methods disclosed in the above-mentioned five prior art documents, however, unequal time-slot allocation which gives time slots to particular nodes at higher rates is performed than the remainings. In such a telecommunications system in which the chances of transmission are given unequally between nodes, some problems will arise. The first problem is that the transmission of an impulse signal will collide with that of a data signal. The second problem is that it will be difficult to freely control the ratio of the size of a time slot that is allocated to each node. Particularly, it is fairly difficult to allocate a time slot having a much greater ratio.

The applicant of the patent application has proposed a solution to the first problem. Even with this proposed solution, the second problem could not be solved.

SUMMARY OF THE INVENTION

It is an object of the present invention to provide a communication control apparatus and a method therefor that can form time slots between communication nodes so that the chances of data transmission are unequal between nodes, and also freely control the ratio of the size of a time slot.

In accordance with the present invention, there is provided a communication control apparatus installed in a communication node in a telecommunications system, the telecommunications system being formed by a plurality of communication nodes including a first node group of bypass nodes which are disposed in a first area and have a high quantitative request to relay data, and a second node group of non-bypass nodes which are disposed in second areas surrounding the first area and have a lower quantitative request to relay data than the first node group. The apparatus includes a signal receiver for receiving a state variable signal from a neighboring node, the state variable signal indicating a timing of data transmission from the neighboring node. The apparatus also includes a calculator for varying a plurality of phase signals different in oscillation period in response to the state variable signal received from the neighboring node, synchronizing states of the phase signals so that the phase signals interact with each other, and temporally multiplexing, within an oscillation period of one phase signal of the phase signals, a plurality of data transmission periods which are different in time slot width and which represent a transmission time period between the communication node in which the apparatus is installed and the neighboring node based on respective oscillation periods of the phase signals to thereby form a communication timing. The apparatus further includes a signal transmitter for transmitting a state variable signal that defines a timing of data transmission from the communication node in which the apparatus is installed based on one of the phase states of the phase signals caused to interact with each other by the calculator. The calculator includes a state manager for managing states of phase signals for the communication node in which the apparatus is installed and the neighboring node different in oscillation period, and prescribing an order relationship of time-slot allocation.

In accordance with the present invention, there are also provided a plurality of communication nodes constituting a telecommunications system. The plurality of nodes form a first node group of bypass nodes which are disposed in a first area and have a high quantitative request to relay data, and a second node group of non-bypass nodes which are disposed in second areas surrounding the first area and have a lower quantitative request to relay data than the first node group. Each of the polarity of communication nodes includes a signal receiver for receiving a state variable signal from a neighboring node of the plurality of communication nodes which is in the vicinity of the communication node, the state variable signal indicating a timing of data transmission from the neighboring node. Each of the plurality of nodes also includes a calculator for varying a plurality of phase signals different in oscillation period in response to the state variable signal received from the neighboring node, synchronizing states of the phase signals so that the phase signals interact with each other, and temporally multiplexing, within an oscillation period of one phase signal of the phase signals, a plurality of data transmission periods which are different in time slot width and which represent a transmission time period between the communication node and the neighboring node based on oscillation periods of the phase signals to thereby form a communication timing. Each of the plurality of nodes further includes a signal transmitter for transmitting a state variable signal that defines a timing of data transmission from the telecommunication node based on one of the phase states of the phase signals caused to interact with each other by the calculator. The calculator includes a state manager for managing states of phase signals for the communication node and the neighboring node different in oscillation period, and prescribing an order relationship of time-slot allocation.

Further in accordance with the present invention, there is provided a telecommunications system including a first node group of bypass nodes which are disposed in a first area and have a high quantitative request to relay data, and a second node group of non-bypass nodes which are disposed in second areas surrounding the first area and have a lower quantitative request to relay data than the first node group. Each node included in the telecommunications system comprises: a signal receiver for receiving a state variable signal from a neighboring node, the state variable signal indicating a timing of data transmission from the neighboring node; a calculator for varying a plurality of phase signals different in oscillation period in response to the state variable signal received from the neighboring node, synchronizing states of the phase signals so that the phase signals interact with each other, and temporally multiplexing, within an oscillation period of one of the phase signals, a plurality of data transmission periods which are different in time slot width and which represent a transmission time period between the telecommunication node and the neighboring node based on oscillation periods of the phase signals to thereby form a communication timing; and a signal transmitter for transmitting a state variable signal that defines a timing of data transmission from the telecommunication node based on one of the phase states of the phase signals caused to interact with each other by the calculator. The calculator includes a state manager for managing states of phase signals for the telecommunication node and the neighboring node different in oscillation period, and prescribing an order relationship of time-slot allocation.

In accordance with the present invention, there is also provided a communication control method of controlling transmission in a communication node in a telecommunications system, the telecommunications system being formed by a plurality of communication nodes including a first node group of bypass nodes which are disposed in a first area and have a high quantitative request to relay data, and a second node group of non-bypass nodes which are disposed in second areas surrounding the first area and have a lower quantitative request to relay data than the first node group. The method comprises the steps of: receiving a state variable signal, which indicates a timing of data transmission, from a neighboring node of the plurality of communication nodes which is in the vicinity of the communication node; and varying a plurality of phase signals different in oscillation period in response to the received state variable signal, synchronizing states of the phase signals so that the phase signals interact with each other, and temporally multiplexing, within an oscillation period of one of the phase signals, a plurality of data transmission periods which are different in time slot width and which represent a transmission time period between the communication own node and the neighboring node based on oscillation periods of the phase signals to thereby form a communication timing. The method further comprises the steps of: managing states of phase signals for the communication node and the neighboring node different in oscillation period and prescribing an order relationship of time-slot allocation; and transmitting a state variable signal that defines a timing of data transmission from the communication node based on one of the phase states of the phase signals caused to interact with each other.

According to present invention, the signal receiver receives a state variable signal indicating a timing of data transmission from a neighboring node. The calculator varies a plurality of phase signals different in oscillation period in response to the state variable signal received from the neighboring node, synchronizes states of the phase signals so that they interact with each other, and temporally multiplexes, within an oscillation period of one of the phase signals, a plurality of data transmission periods which are different in time slot width and which represent a transmission time period between its own node and the neighboring node based on the oscillation periods of the phase signals to thereby form a communication timing. The state manager of the calculator manages states of phase signals for the own node and the neighboring node different in oscillation period, and prescribes an order relationship of time-slot allocation. The signal transmitter transmits a state variable signal that defines a timing of data transmission from the own node based on one of the phase states of the phase signals caused to interact with each other by the calculator. This configuration of the present invention can form time slots between nodes so that the chances of data transmission between nodes are made unequal, and also freely control the ratio of the size of a time slot. The configuration further makes it possible to realize time-slot allocation that has various multiplexed time structures so as to meet requirements of various applications.

BRIEF DESCRIPTION OF THE DRAWINGS

The objects and features of the present invention will become more apparent from consideration of the following detailed description taken in conjunction with the accompanying drawings in which:

FIG. 12 is a timing chart useful for understanding how time slots are allocated to nodes according to an alternative embodiment of the communication control apparatus of the present invention.

DESCRIPTION OF THE PREFERRED EMBODIMENTS

Figure 3:
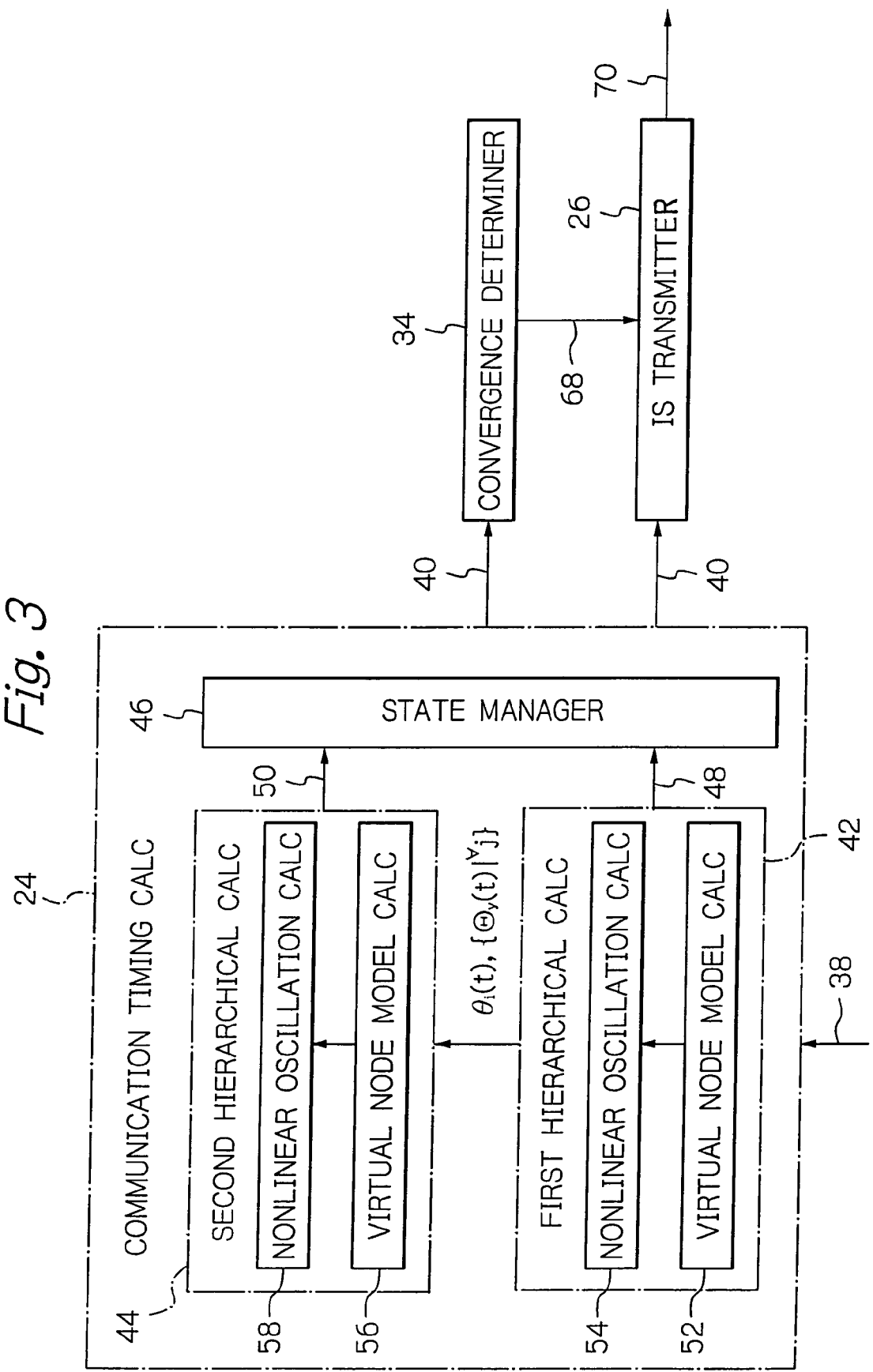
FIG. 3 is a schematic block diagram showing a configuration of a communication timing calculator included in the node of FIG. 1.

Preferred embodiments of a communication control apparatus according to the present invention will hereinafter be described in detail with reference to the accompanying drawings. Referring first to FIG. 3, the illustrative embodiment of the communication control apparatus of the present invention generally includes an impulse signal (IS) receiver 22 adapted to receive a state variable signal indicating a timing of data transmission from a neighboring communication node; a communication timing calculator 24 defining a communication timing, by varying a plurality of phase signals different in oscillation period in response to the state variable signal received from the neighboring node, synchronizing respective states of the phase signals so that they interact with each other, and temporally multiplexing, within an oscillation period of one of the phase signals, a plurality of data transmission periods which are different in time slot width or duration and which represent a transmission time period between its own node and the neighboring node based on respective oscillation periods of the phase signals; a state manager 46 of the communication time calculator 24 adapted to manage states of phase signals for the own node and the neighboring node different in oscillation period, and prescribe an order relationship of time-slot allocation; and an impulse signal transmitter 26 adapted to transmit a state variable signal that defines the timing of data transmission from the own node based on any one of the phase states of the phase signals caused to interact with each other by the communication timing calculator 24. With this configuration, time slots between nodes can be formed so that the chances of data transmission between nodes become unequal, and the ratio of the size of a time slot can also be freely controlled. This configuration further enables the realization of time-slot allocation that has various, multiplexed time structures so as to meet the requirements of various applications.

In the illustrative embodiment, the communication control apparatus of the present invention is applied to a sensor node 10 forming a communication network for sensors. It is to be noted that parts or elements not directly relevant to understanding of the present invention will neither be described nor shown for avoiding redundancy.

Figure 1:
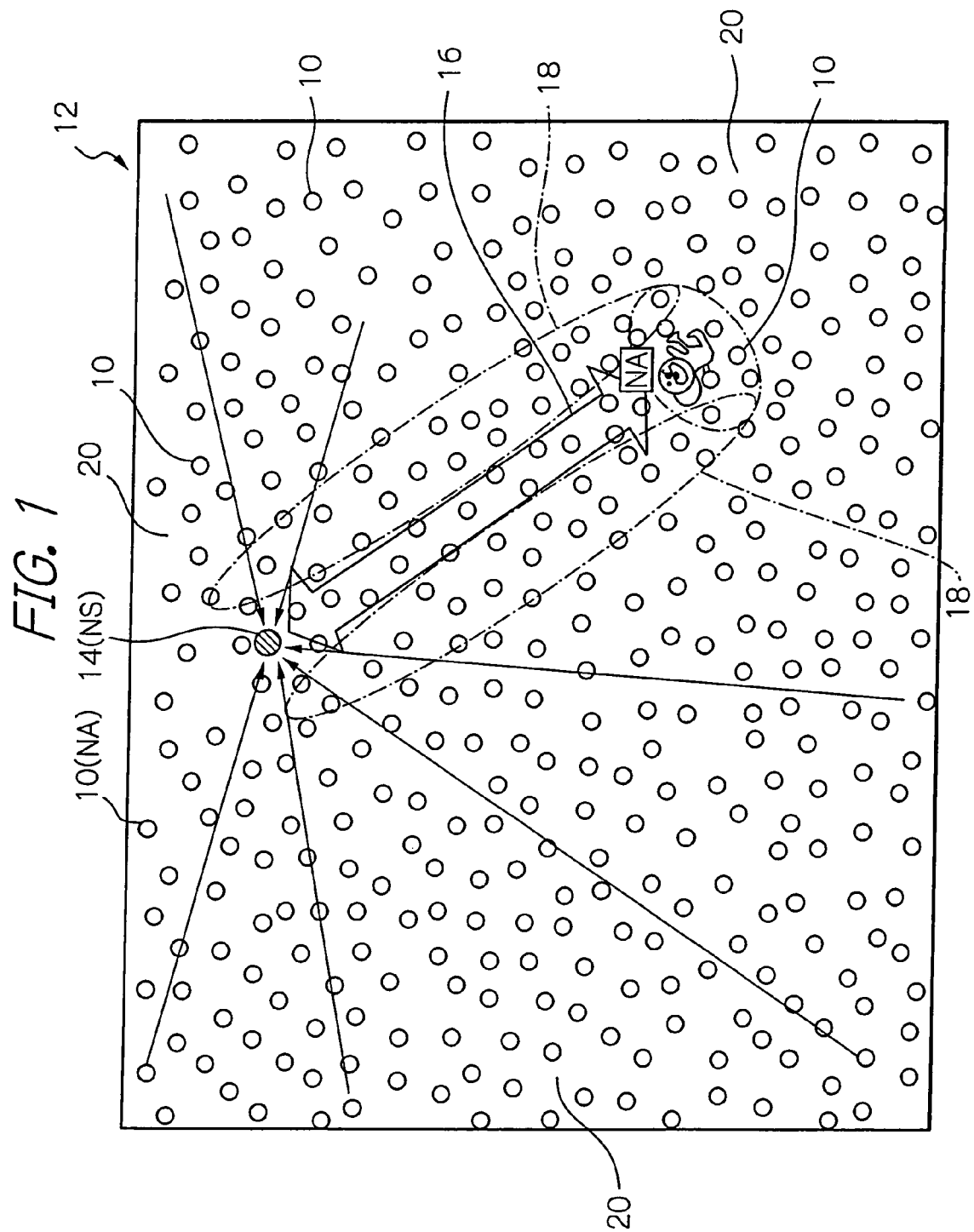
FIG. 1 illustrates node disposition in an illustrative embodiment to which the communication control apparatus of the present invention is applied.

A telecommunications system 12, as shown in FIG. 1, includes a particular sensor node 10 and a sink node 14. The sensor node 10 is also referred to simply as a node. The telecommunications system 12 functions to allocate time slots to the sensor node 10 at a high rate so that it can form a telecommunications system in which the chances of data transmission are unequal between nodes. The sensor node 10 in the telecommunications system 12 has the function of transferring data generated in the node 10 (NA) to the sink node 14 (NS) in real time with first priority. The reference letters NA specify a node, while the reference letters NS specify the sink node. To implement this transfer function, the sensor node 10 is configured to increase the transmission rate at which a node lying in a certain area transmits data and reduce the transmission rates at which nodes around the node of interest transmit data.

The nodes in the telecommunications system 12 are classified into three broad categories according to function: a bypass node that increases its data transmission rate; a non-bypass node that reduces its data transmission rate; and a normal node other than bypass and non-bypass nodes. As depicted in FIG. 1, the areas which the respective kinds of nodes belong to are called a bypass node area 16, a non-bypass node area 18, and a normal node area 20. The bypass nodes reside along a straight line extending from the source nodes 10 (NA), which transmits data with first priority, to the sink node 14 (NS). The non-bypass nodes are disposed in a range in which they interact with the bypass nodes. The telecommunications system 12 will be described on the assumption that each node has been defined in advance to be either one of the three categories of nodes.

While the illustrative embodiment is applied to a specific type of system in which a large number of spatially distributed nodes transmit and receive data therebetween by radio, the present invention is not to be limited to such a wireless telecommunications system. The invention is also applicable to systems in which a great number of spatially distributed notes are electrically connected, i.e. hard wired, to one another. For instance, it is likewise applicable to wired local area networks (LANs) such as an Ethernet® network. Besides, the present invention can be applied to wired networks in which different categories of nodes, such as sensor nodes, actuator nodes, and server nodes, exist together, and to networks in which wired nodes and wireless nodes exist together.

Thus, the present invention is applicable to dealing with the problems of data collision and synchronization existing in various types of networks, regardless of whether they are wireless or wired network systems. Accordingly, the present invention can be applied to a communication protocol to achieve efficient data transmission with both adaptability and stability.

Figure 2:
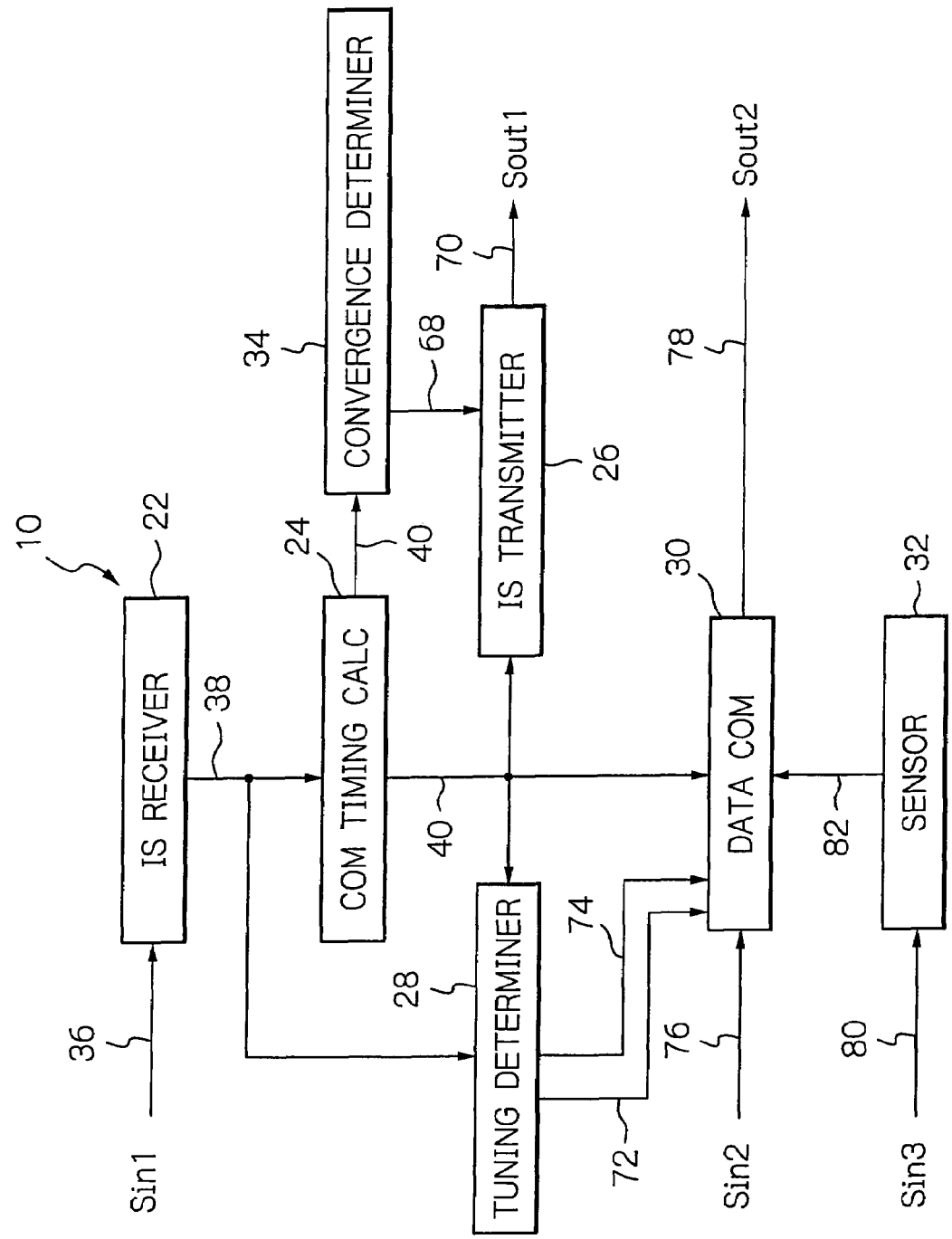
FIG. 2 is a schematic block diagram of a configuration of one of the nodes shown in FIG. 1.

The node 10, as shown in FIG. 2, includes the impulse signal receiver 22, communication timing calculator 24, impulse signal transmitter 26, tuning determiner 28, data communicator 30, sensor 32, and convergence determiner 34, which are interconnected as illustrated. In the node 10, the impulse signal receiver 22, communication timing calculator 24, impulse signal transmitter 26, tuning determiner 28, and convergence determiner 34 form a communication control apparatus.

The impulse signal receiver 22 has the function of receiving as an input impulse signal (Sin1) 36 an output impulse signal transmitted from a neighboring node. In the following description, signals are designated by reference numerals given to connection lines on which the signals appear. In addition, two nodes are considered to be neighboring if they lie in a range where each other's impulse signals are received. In the illustrative embodiment, the input impulse signal (Sin1) 36 is fed as a timing signal and has, for example, a Gaussian waveform. The impulse signal receiver 22 also has the function of recognizing, based on the node identity attribute information added to the received input impulse signal 36, the node identity attribute of the neighboring node that is the source node.

It should be noted that the impulse signals transmitted and received between nodes to which the present invention is applied are not limited to specific forms so far as they can convey particular timings between the nodes. The simplest example of an impulse signal, in addition to the above Gaussian waveform, is a single pulse with a functional waveform such as a rectangular waveform. However, an impulse signal is not always a single pulse but may consist of a plurality of pulses representing a single meaning in the entirety thereof.

For instance, a pulse train corresponding to a particular pattern of bits can be employed as one impulse signal. This type of impulse signal is effective when, under an environment in which many noise signals are present, a single pulse alone cannot discriminate between signals. As used in the illustrative embodiment, an impulse signal conceptually represents a signal indicative of a particular timing and can be implemented in various manners.

Node identity attribute information is information added to an impulse signal by the source node to indicate that a node of interest is either one of the bypass, non-bypass and normal nodes.

In the illustrative embodiment, while an impulse signal indicative of a particular timing is given a node identification number, it may further contain some type of data.

The impulse signal receiver 22 is adapted to identify, based on the node identity attribute information, which node is a source node and output the node identity attribute information of the identified source node and received impulse signal to the communication timing calculator 24 and tuning determiner 28 in the form of output signal 38.

The communication timing calculator 24 has the function of generating a phase signal that prescribes a communication timing at its own node, based on the output signal 38. The phase-signal generating function is characterized in that it is realized based on two nonlinear oscillator models that are different in oscillation period from each other. The communication timing calculator 24 includes a first hierarchical calculator 42, a second hierarchical calculator 44, and a state manager 46, as shown in FIG. 3. The communication timing calculator 24 is adapted to control the operation of the first and second hierarchical calculators 42 and 44 according to a difference in causing its own node to function as either one of bypass, non-bypass, and normal nodes.

The communication timing calculator 24, when causing its own node to function as a normal node, outputs a phase signal 48 calculated by the first hierarchical calculator 42 to the impulse signal transmitter 26 as a phase signal 40 through the state manager 46. In causing its own node to function as either a bypass node or a non-bypass node, the communication timing calculator 24 controls the first and second hierarchical calculators 42 and 44 so that they are operated in cooperation with each other, and outputs a phase signal 50 calculated by the second hierarchical calculator 44 to the convergence determiner 34 as a phase signal 40 through the state manager 46. These respects will be further described later. The communication timing calculator 24 also has the function of generating a phase signal 40 calculated in its own node even when no input impulse signal is received, as in the case where it starts its initial operation.

As shown in FIG. 3, the first hierarchical calculator 42 comprises a virtual node model calculator 52 and a nonlinear calculator 54, which are interconnected as depicted. The second hierarchical calculator 44 similarly comprises a virtual node model calculator 56 and a nonlinear calculator 58.

Further, the fundamental configuration and operation of the first and second hierarchical calculators 42 and 44 will be described in detail with reference to FIGS. 4A through 5C. Because the state transitions illustrated in FIGS. 4A through 5C also relate to the function of the impulse signal transmitter 26, they will be described along with the function of the impulse signal transmitter 26. As shown in the figures, a node of interest may sometimes be referred to as its own node, while a neighboring node may be another node.

Directing attention to a certain node, a relationship between the certain node and its neighboring node, i.e. a phase relationship between the respective nonlinear oscillation rhythms varies with time. FIGS. 4A through 5C demonstrate how the phase relationship varies with time.

Figure 4A:
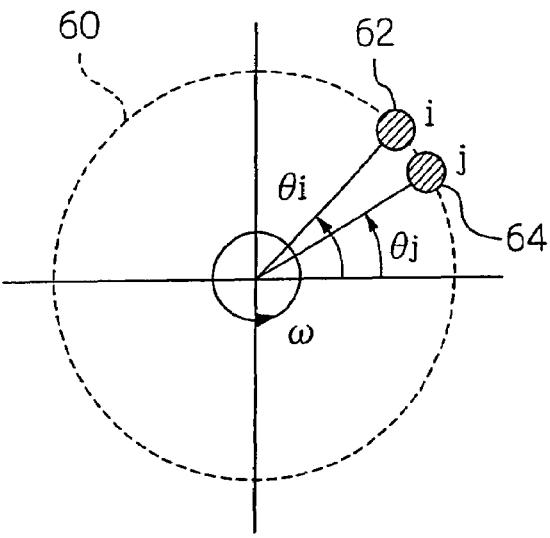
FIG. 4A illustrates the initial state of the interaction between two nodes in the illustrative embodiment.
Figure 4B:
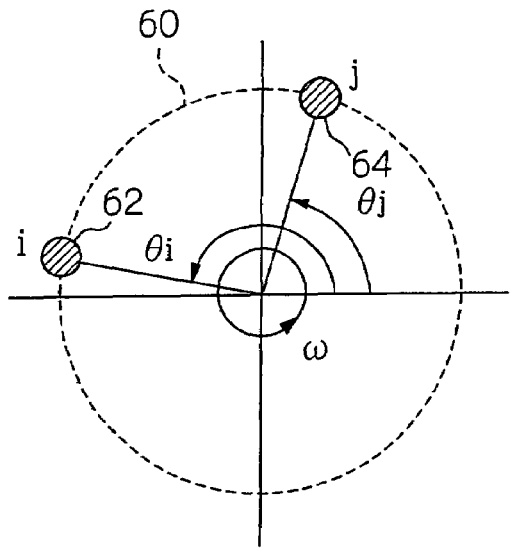
FIG. 4B illustrates the transitional state of the interaction between the two nodes.
Figure 4C:
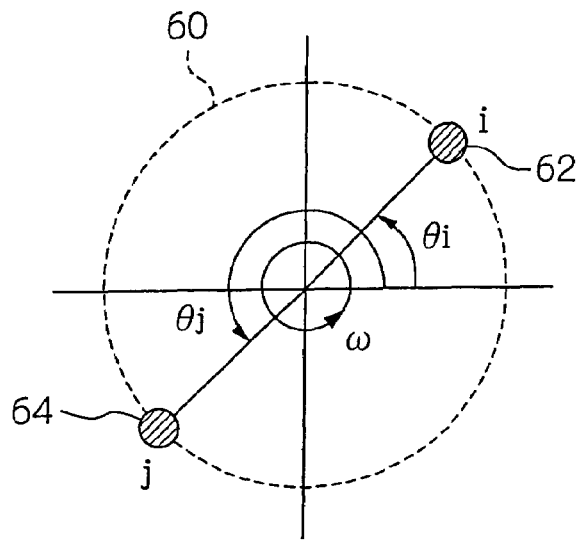
FIG. 4C illustrates the steady state of the interaction between the two nodes.

First, FIGS. 4A, 4B, and 4C are directed to the case where a node of interest i interacts with one neighboring node j. Two material points 62 and 64, which rotate on a circle indicated by a dashed line 60, represent the movements of nonlinear oscillation rhythms corresponding to the nodes i and j, respectively. The angles $\theta_i$ and $\theta_j$ of the two material points 62 and 64 on the circle represent the values of phase signals at that time. When the rotational movements of the material points 62 and 64 are projected onto the vertical or horizontal axis, the nonlinear oscillation rhythms of the nodes i and j correspond to the movements of the projected points.

In accordance with the motion expressed by an expression (1) to be described later, the two material points 62 and 64 try to become opposite in phase to each other. As a result, even when the phases of the two material points 62 and 64 are close to each other in an initial state shown in FIG. 4A, the phase relationship therebetween passes through a transitional state shown in FIG. 4B and finally reaches a steady state. In the steady or stable state, as shown in FIG. 4C, a phase difference between the two material points 62 and 64 is approximately $\pi$ radians.

Each of the two material points 62 and 64 rotates on a common center with its natural angular frequency parameter $\omega$ set to a basic angular velocity equivalent to a basic velocity at which its own operating state makes a transition. If the two nodes interact with each other by transmission and reception of impulse signals, the material points 62 and 64 adjust their angular velocities as a result of the interaction, and finally reach a steady state in which an appropriate phase relationship is maintained. This series of operations can be considered as forming a stable phase relationship by mutual repulsion of the two material points 62 and 64 during rotation. In the steady state, as described later, if respective nodes transmit impulse signals at a predetermined phase, e.g. at a phase of zero, then the transmission timings at the respective nodes are to form an appropriate timing relationship.

Figure 5A:
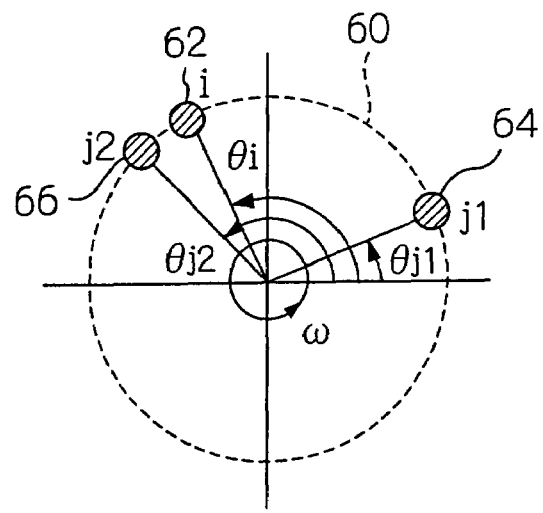
FIG. 5A illustrates the initial state of the interaction between three nodes in the illustrative embodiment.
Figure 5B:
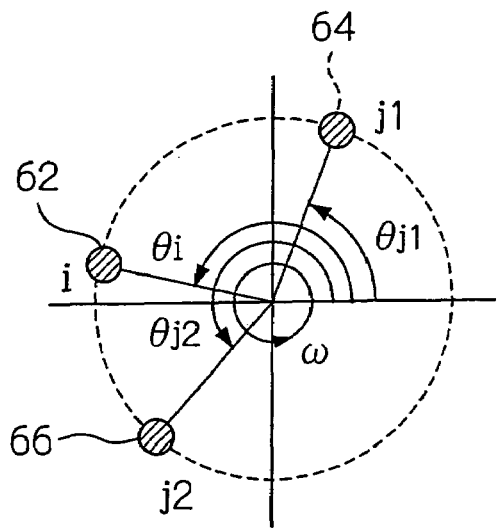
FIG. 5B illustrates the transitional state of the interaction between the three nodes.
Figure 5C:
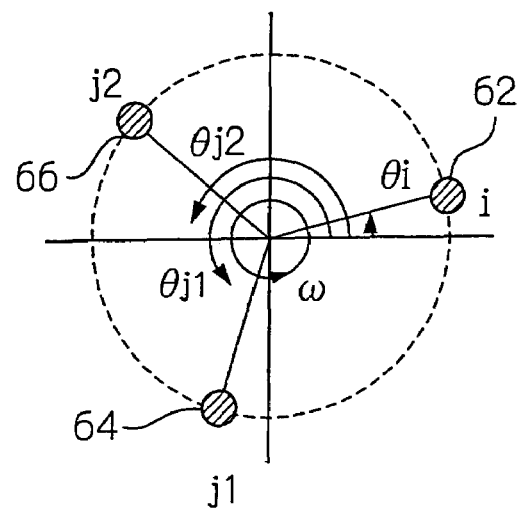
FIG. 5C illustrates the steady state of the interaction between the three nodes.

FIGS. 5A, 5B, and 5C illustrate the case where the node of interest i (62) interacts with two neighboring nodes j1 (64) and j2 (66). Even in an initial state shown in FIG. 5A in which two neighboring nodes exist, the material points 62, 64, and 66 pass through a transitional state in which they repel one another while rotating as shown in FIG. 5B; form a stable phase relationship shown in FIG. 5C; and reach a steady state. The stable phase relationship refers to stability with respect to time. Even in the case of three or more neighboring nodes, they finally reach a steady state in the same manner as the preceding example.

As to the formation of the stable phase relationship or steady state described above, the telecommunications system 12 is easily adaptable to a change in number of neighboring nodes. For example, assume that when a node of interest and a neighboring node are in a stable relationship or steady state, another neighboring node will be added. At this stage, the steady state is destroyed, but after passing through a transitional state, the telecommunications system 12 forms a new steady state such as the one shown in FIG. 5C. Similarly, the telecommunications system 12 operates adaptively even when one of the two neighboring nodes is removed or malfunctions.

Returning to FIG. 2, the communication timing calculator 24 functions to output the generated phase signal $(=\theta_i(t))$ 40 to the impulse signal transmitter 26, tuning determiner 28, and data communicator 30.

Although the detailed function of the impulse signal transmitter 26 is to be described later, the impulse signal transmitter 26 functions to receive the phase signal 40 from the communication timing calculator 24 and then transmit an impulse signal 70 at a predetermined timing in response to a determination result 68, transmitted from the convergence determiner 34, which indicates whether or not the processing in the communication timing calculator 24 has converged. In transmitting the impulse signal 70, the impulse signal transmitter 26 also functions to add the node identity attribute information of its own node to the impulse signal 70 and then transmit the impulse signal (Sout1) 70 containing the node identity attribute information.

The tuning determiner 28 has the function of determining, for example, by the method taught in the aforementioned U.S. patent '796 to Date et al., whether the mutual adjustment of the transmission timings of impulse signals at its own node and one or more neighboring nodes is in the transitional state shown in the FIGS. 4B and 5B or steady state shown in FIGS. 4C and 5C. The tuning determiner 28 observes the timing of the received impulse signal 38 corresponding to an output impulse signal of another node and timing of an output impulse signal of its own node, and determines that the mutual adjustment is in the steady state if the timing difference between the nodes is stable with respect to time. In the illustrative embodiment, the tuning determiner 28 receives the phase signal 40 instead of the output impulse signal, as a signal for recognizing the output timing of an output impulse signal from its own node.

The tuning determiner 28 functions to output a tuning decision signal indicating a determination result every oscillation period of the phase signal 40 to the data communicator 30, and also functions to output the minimum value β1 of the value of the phase signal 40 at the reception timing of an input impulse signal to the data communicator 30 as a slot signal 74.

The reason why the minimum value β1 is output as the slot signal 74 is related to the fact that, as described above, α=0. Accordingly, the value of β as the slot signal 74 changes, depending upon selection of the value of α.

The node 10 has both the function of receiving data (Sin2) from another node and relaying and retransmitting the received data and the function of transmitting data from its own node as a source node. These functions are implemented by the data communicator 30. The data communicator 30 is configured to output at least either an observed data signal or an input data signal to another node as an output data signal (Sout2) 78. When relaying a signal, the data communicator 30 receives as an input data signal (Sin2) 76 a data signal which was output as an output data signal by a neighboring node. When the tuning decision signal 72 indicates a steady state, the data communicator 30 transmits the output data signal 78 to another node in a time slot described later. On the other hand, when the tuning decision signal 72 indicates a transitional state, the data communicator 30 stops transmission.

The words "time slot" are used in the context although they are not directed to a fixed time internal allocated by the system. The output data signal 78 may be transmitted in the same frequency band as the output impulse signal 70.

The sensor 32 is a specific example of transmission source applied to the case where it transmits signals. The sensor 32 has the function of sensing, for example, physical/chemical environment information (Sin3) 80 such as strength of sound or oscillation, chemical concentration, and temperature, to output sensed observation data 82 to the data communicator 30.

The convergence determiner 34 has the function of determining whether or not the processing in the communication timing calculator 24 has been converged, though its function will be described in detail later. The convergence determiner 34 functions to output a determination result 68 to the impulse signal transmitter 26.

The node 10 in the illustrative embodiment is characterized in that, as shown in FIG. 3, the communication timing calculator 24 includes the state manager 46. In this respect, the communication timing calculator 24 differs in configuration from the conventional communication timing calculator. Particularly, the communication timing calculator 24, as previously described, has the function of carrying out calculations that determines the timing at which its own node transmits an impulse signal, by employing impulse signals received from other nodes j lying within the interaction range.

In the methods disclosed in the aforementioned '796 US publication to Date et al., '841 US publication to Date et al., and '441 US publication to Date et al., and '617 and '619 JP publications, the communication timing calculator 24 is equipped with nonlinear oscillator models that are the same in oscillation period and performs calculations based on these models. In contrast, the communication timing calculator 24 of the illustrative embodiment is equipped with a plurality of nonlinear oscillator models different in oscillation period, these models being operated in cooperation with one another so as to form a timing structure having a multiplexed timing relationship between nodes.

The communication timing calculator 24 employs a plurality of nonlinear oscillator models different in oscillation period, and the first and second hierarchical calculators 42 and 44 shown in FIG. 3 correspond to the two nonlinear oscillator models shown in FIGS. 4A, 4B and 4C. In the normal one of the three categories of nodes, the communication timing calculator 24 operates only the first hierarchical calculator 42 without operating the second hierarchical calculator 44. That is to say, normal nodes can be operated even if they are the same in structure as the methods disclosed in the aforementioned five patent documents. In the following description, all nodes are assumed to be the same in structure as FIG. 3, and in normal nodes, it is also assumed that only the first hierarchical calculator 42 is operated. The virtual normal node calculators 52 and 56 in the illustrative embodiment employ the method disclosed in the aforementioned '441 JP publication.

In response to an impulse signal received from neighboring node j, each of the virtual model calculators 52 and 56 functions to generate a virtual phase model corresponding to the source node interiorly of its own node. Using this virtual phase model, each of the virtual model calculators 52 and 56 calculates the phase of the neighboring node j falsely and is able to continuously observe a phase difference between its own node i and the neighboring node j. The virtual model calculators 52 and 56 are not limited to the type used in the illustrative embodiment.

The first hierarchical calculator 42 carries out calculations based on expressions, which represent nonlinear oscillation models, such as Expressions (1) and (2). The detailed configuration of the first hierarchical calculator 42 is shown in FIG. 1 of the aforementioned '441 JP publication by way of example.

$$\frac{d\theta_i(t)}{dt} = \omega_{i1} + k_{R1} \sum_j R_1(\Delta\Theta_{ij}(t)) + \xi_1(S_{i1}(t)) \tag{1}$$

$$\Delta\Theta_{ij}(t) = \Theta_{ij}(t) - \theta_i(t) \tag{2}$$

Expressions (1) and (2) represent a rule that temporally evolves and varies the rhythm of nonlinear oscillation in the first hierarchical calculator 42 of its own node i in response to an impulse signal received from neighboring node j. In Expressions (1) and (2), a variable t represents time, and a variable $\theta_i(t)$ represents the phase of nonlinear oscillation in the first hierarchical calculator 42 of its own node i and is a variable representing a phase state at time t. The variable $\theta_i(t)$ is replaced by its remainder after division by $2\pi$ (modulo $2\pi$ arithmetic) so that it always has a value of $0 \leq \theta_i(t) < 2\pi$. The symbol d/dt represents a derivative with respect to time t, and $d\theta_i(t)/dt$ is a derivative of the phase $\theta_i(t)$ with respect to time t and represents a state variable. $\omega_{i1}$ is a natural angular frequency parameter and represents the basic rhythm of the nonlinear oscillation in the first hierarchical calculator 42 of node i.

The illustrative embodiment employs the differential equation of Expression (1) in the communication timing calculator 24, but the description using the differential equation is a mere example for prescribing a method of calculation. It is also possible to employ a method of discretely handling the time evolution of the phase $\theta_i(t)$ in the time axis direction, or a method of discretely handling the time evolution of $\theta_i(t)$ and $d\theta_i(t)/dt$ in the time axis direction, i.e., quantizing the value of the $\theta_i(t)$.

As the simplest example, it is assumed that the values of the natural angular frequency parameter $\omega_{i1}$ have been set to the same value beforehand in the entire system. In this case, the period $T_{i1}$ of oscillation at the converged state in the first hierarchical calculator 42 is $T_{i1}=2\pi/\omega_{i1}$. A method of decision for a value of the natural angular frequency parameter $\omega_{i1}$ will be disclosed in the second hierarchical calculator 44 that is to be described later.

Note that the present invention is able to operate nodes even if they are different in $\omega_{i1}$ and $\omega_{i2}$ from one another. For instance, it may operate nodes with the values of $\omega_{i1}$ and $\omega_{i2}$ varied slightly near the center of its reference value according to probability distribution such as Gaussian distribution.

The variable $\Theta_{ij}(t)$ is a virtual phase obtained by falsely calculating in node i the phase of nonlinear oscillation in the first nonlinear calculator 42 of neighboring node j. In response to an impulse signal received from neighboring node j, the virtual phase $\Theta_{ij}(t)$ is calculated by the virtual node model calculator 52 in the first hierarchical calculator 42 of node i. The method of calculation of the virtual phase $\Theta_{ij}(t)$ by the virtual node model calculator 52 will be disclosed later. The variable $\Delta\Theta_{ij}(t)$ is a phase difference obtained by subtracting the phase $\theta_i(t)$ of node i from the virtual phase $\Theta_{ij}(t)$ of neighboring node j calculated by the virtual node model calculator 52. For convenience, a value of the addition of $2\pi$ to the phase difference $\Delta\Theta_{ij}(t)$ is replaced with its remainder after division by $2\pi$ (modulo $2\pi$ arithmetic) so that the phase difference $\Delta\Theta_{ij}(t)$ has a value of $0 \leq \Delta\Theta_{ij}(t) < 2\pi$.

The function $R_1(\Delta\Theta_{ij}(t))$ is a response characteristic function for varying the oscillation rhythm in the first hierarchical calculator 42 of its own node i according to the phase difference $\Delta\Theta_{ij}(t)$. The function $R_1(\Delta\Theta_{ij}(t))$ has a dynamic characteristic that repels the phase $\theta_i(t)$ of node i from the virtual phase $\Theta_{ij}(t)$ of neighboring node j. A specific example of the function form of $R_1(\Delta\Theta_{ij}(t))$ is the same as the form disclosed in the aforementioned '619 JP publication. The function form of $R_1(\Delta\Theta_{ij}(t))$ is not limited to the example disclosed in that publication. The term of $\Sigma$ represents the sum total of the function $R_1(\Delta\Theta_{ij}(t))$ of neighboring node j. The indication $k_{R1}$ is a coupling coefficient parameter for determining the contribution of the function $R_1(\Delta\Theta_{ij}(t))$ to the time evolution of the phase $\theta_i(t)$, i.e. weight, and its value is determined, for example, experimentally.

The form of the phase response function $R(\Delta\Theta_{ij}(t))$ is not limited to the form described above. It is needless to say that the phase response function for carrying out the present invention may assume various forms of functions.

The function $\xi_1(S_{i1}(t))$ is a stress response function that, when a relative phase difference PD1 between node i and its neighboring node j is small, cumulates stress and produces a phase shift of random magnitude responsive to a stress value $S_{i1}(t)$ cumulated. The relative phase difference PD1 is defined by the following Expression (3):

$$PD1 = \Delta\Theta_{ij}(t) \text{ at the } \Delta\Theta_{ij}(t) \leq \pi$$

$$PD1 = 2\pi - \Delta\Theta_{ij}(t) \text{ at the } \Delta\Theta_{ij}(t) > \pi \quad (3)$$

That is, the function $\xi_1(S_{i1}(t))$ is a function representative of a response characteristic to the cumulated stress value $S_{i1}(t)$, its function form being the same as the form disclosed in the aforementioned '617 JP publication by way of example.

Expressions (1) and (2) are solved using a numerical approximation technique for solving differential equations, such as the Runge-Kutta method, and can be installed in each node as software. The Runge-Kutta method is one method of calculating the time evolution of a state variable by using difference equations (i.e. recurrence equations) obtained from differential equations by converting a continuous time variable to discrete time. As with the forms disclosed in the above '617 publication, using difference equations obtained from differential equations by other methods simpler than the Runge-Kutta method, it is also possible to calculate changes in a state variable. Further, if circuitry is configured to operate the same as Expressions (1) and (2), then it can be installed in each node as hardware.

Now, the calculation of the virtual phase $\Theta_{ij}(t)$ by the virtual node model calculator 52 will be described. As described above, the virtual node model calculator 52 has the functions of receiving an impulse signal from neighboring node j, generating a virtual phase model of neighboring node j, and falsely calculating the phase of neighboring node j. These functions are approximately the same as the second and third embodiments disclosed in the aforementioned '840 publication to Date et al.

Figure 6:
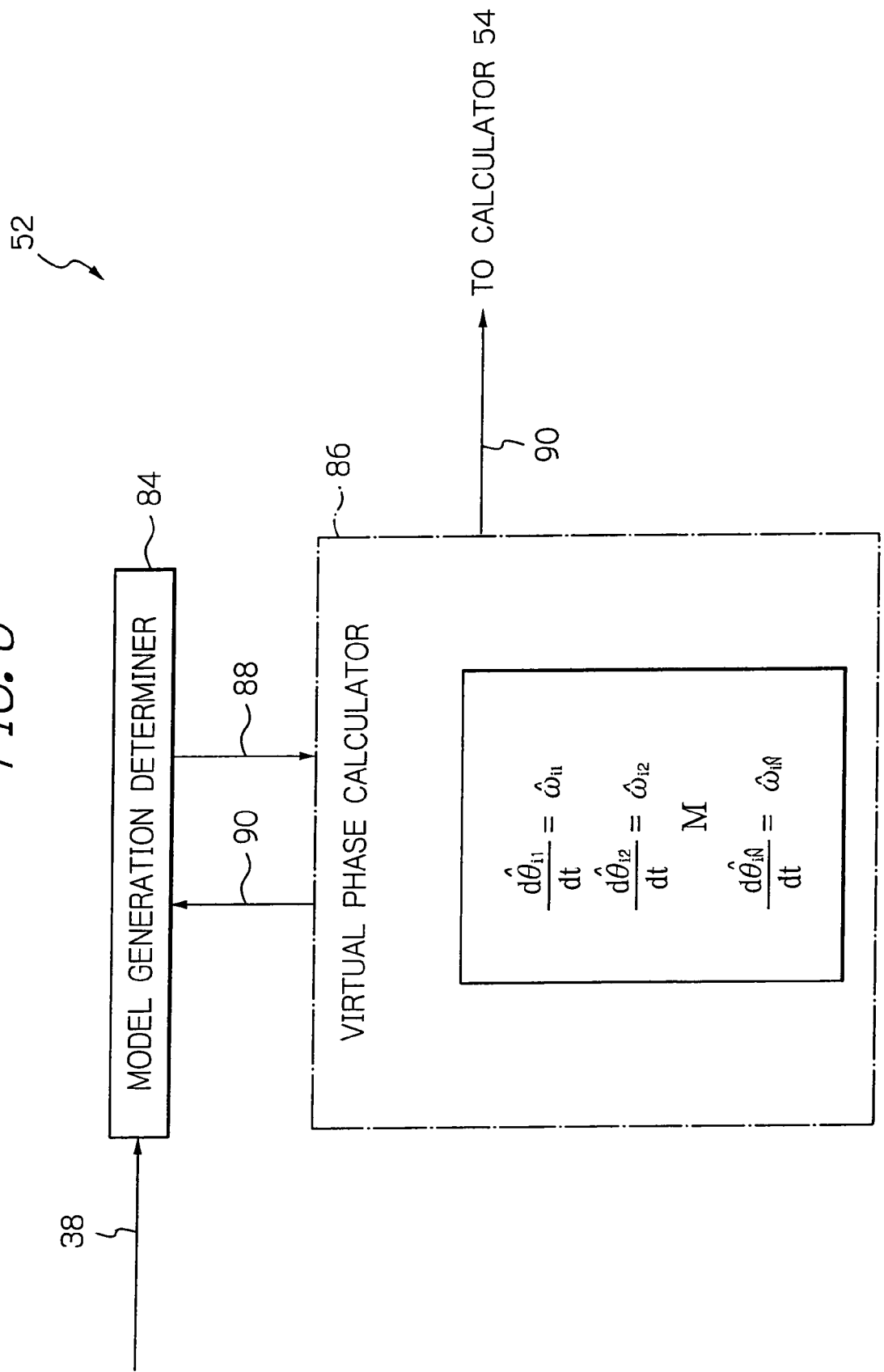
FIG. 6 is a schematic block diagram useful for understanding the functions of a virtual node model calculator shown in FIG. 3.

As shown in FIG. 6, the virtual node model calculator 52 includes a model generation determiner 84 and a virtual phase calculator 86, which are interconnected as depicted. The calculation of a virtual node model will be described in the case where an identification (ID) indicative of a source node is not attached to an impulse signal as a node identification number. However, it is a matter of course that this calculator 52 can likewise calculate a virtual node mode even when ID is attached to an impulse signal.

The model generation determiner 84 generates a phase model relative to neighboring node j by the following method in response to an impulse signal 38 received from the neighboring node j. Assume that each node transmits an impulse signal, for example, at a phase $\Psi=0$.

First, the virtual phase calculator 86, which is to be described later, calculates a relative phase difference $\hat{\delta}_{ij}(t)$ between a virtual phase $\Theta_{ij}(t)$ relative to the neighboring node j, where j=1, 2, ..., and $\hat{N}_i$, and the phase $\Psi$. The variable $\hat{N}_i$ is the sum total of virtual phase models in the node i at time t when impulse signals were received. The relative phase difference $\hat{\delta}_{ij}(t)$ is calculated according to the following Expressions (4), (5), and (6).

Next, the virtual phase calculator 86 calculates the minimum value of the relative phase difference $\hat{\delta}_{ij}(t)$ (j=1, 2, ..., and $\hat{N}_i$). It also detects the number u of the virtual phase model that has the minimum value of the relative phase difference $\hat{\delta}_{ij}(t)$. The number u is any number of 1, 2, ..., and $\hat{N}_i$.

Next, when the minimum value of the relative phase difference obtained is less than an additional decision parameter e that is set to a threshold value, the phase $\Theta_{ij}(t)$ of the virtual phase model with the minimum value is corrected to a phase $\Psi$ (88). Conversely, when the minimum value of the relative phase difference obtained is the additional decision parameter e or greater, the model generation determiner 84 inputs a new virtual phase model 88 to the virtual phase calculator 86.

The initial phase of the added model 88 is set to the phase $\Psi$. The additional decision parameter e is a constant parameter and its value is experimentally determined.

$$\hat{p}_{ij}(t) = \Theta_{ij}(t) - \Psi \qquad (4)$$

$$\hat{\delta}_{ij}(t) = \hat{p}_{ij}(t) \text{ at the } \hat{p}_{ij}(t) \leq \pi \qquad (5)$$

$$\hat{\delta}_{ij}(t) = 2\pi - \hat{p}_{ij}(t) \text{ at the } \hat{p}_{ij}(t) > \pi \qquad (6)$$

For convenience, by replacing a value of the addition of $2\pi$ to $\hat{p}_{ij}(t)$ with its remainder after division by $2\pi$, $\hat{p}_{ij}(t)$ has a value of $0 \leq \hat{p}_{ij}(t) < 2\pi$.

These processes are expressed by the following Expressions (7), (8), and (9):

$$u = \arg_{j \in Z_i}{}^{min}(\hat{\delta}_{ij}(t)) \qquad (7)$$

$$\Theta_{iu}(t) = \Psi, \text{ phase correction at the } {}_{j \in Z_i}{}^{min}(\hat{\delta}_{ij}(t)) < e \qquad (8)$$

$$\Theta_{i(N_i+1)}(t) = \Psi, \text{ phase model addition at the } {}_{j \in Z_i}{}^{min}(\hat{\delta}_{ij}(t)) \geq e \qquad (9)$$

In Expressions (8) and (9), $Z_i$ represents a set of virtual phase models relative to the neighboring nodes j (j=1, 2, ..., and $\hat{N}_i$) generated in the virtual phase calculator 86 of its own node i.

The virtual phase calculator 86 has the function of falsely calculating the phase of the neighboring node j by using a virtual phase model relative to the neighboring node j. The virtual phase calculator 86 outputs to the model generation determiner 84 and nonlinear oscillation calculator 54 a phase 90 in neighboring node j calculated. In addition, when the phase correction process on some virtual phase model is not continuously carried out at intervals of an N oscillation period that is a constant parameter, the virtual phase calculator 86 extinguishes that virtual phase model. The constant parameter N is arbitrary and can be experimentally determined. As described later, as for convergence information, neighboring node j does not always transmit an impulse signal at a fixed period $T_{i1}$ representative of the oscillation period in the convergence state of the first hierarchical calculator 42. For instance, assuming the oscillation period in the convergence state of the second hierarchical calculator 44 is represented by $T_{i2}$, neighboring node j sometimes transmits an impulse signal in the case of period $T_{i1}$<period $T_{i2}$. For that reason, it is desirable for the constant parameter N to have a value so that it meets $N \times T_{i1} \geq T_{i2}$.

Now, the functional configuration of the second hierarchical calculator 44 will be disclosed. The second hierarchical calculator 44 has the function of calculating the phase $\lambda_i(t)$ of a nonlinear oscillation model in the second hierarchical calculator 44, based on an impulse signal received from neighboring node j, phase $\theta_i(t)$ of a nonlinear oscillation model obtained in the first hierarchical calculator 42 of its own node i, and predetermined equations. For example, the second hierarchical calculator 44 performs calculations based on expressions representing nonlinear oscillation models such as Expressions (10), (11), and (12):

$$\frac{d\lambda_i(t)}{dt} = \omega_{i2} + k_{F2}F_2(\theta_i(t), \lambda_i(t), \{\Theta_{ij}(t) \mid {}^{\forall} j\}, \{\Lambda_{ij}(t) \mid {}^{\forall} j\}) + \sum_j G_2(\Delta\Lambda_{ij}(t) + \xi_2(S_{i2}(t)) \qquad (10)$$

$$\Delta\Lambda_{ij}(t) = \Lambda_{ij}(t) - \lambda_i(t) \qquad (11)$$

$$G_2(\Delta\Lambda_{ij}(t)) = \begin{cases} k_{H2}H_2(\Delta\Lambda_{ij}(t)) & \text{at } i, j \in NBP \\ k_{R2}R_2(\Delta\Lambda_{ij}(t)) & \text{at } i, j \notin NBP \end{cases} \qquad (12)$$

Expressions (10) (11) and (12) represent a time evolution rule that temporally varies the rhythm of nonlinear oscillation in the second hierarchical calculator 44 of its own node i based on an impulse signal received from its neighboring node j.

The variable t denotes time and $\lambda_i(t)$ denotes a state variable indicative of the phase state of nonlinear oscillation in the second hierarchical calculator 44 of its own node i at time t. $\lambda_i(t)$ is replaced by its remainder after division by $2\pi$ so that it always has a value of $0 \leq \lambda_i(t) < 2\pi$. $d\lambda_i(t)/dt$ denotes a variable after differentiation of the phase $\lambda_i(t)$ with respect to time t. $\omega_{i2}$ is the basic rhythm of nonlinear oscillation in the second hierarchical calculator 44 of node i.

As an example of the simplest case, assume that values of the parameter $\omega_{i2}$ have been set to the same value in the entire system beforehand. In this case, the period $T_{i2}$ of oscillation in its convergence state in the second hierarchical calculator 44 is expressed as $T_{i2}=2\pi/\omega_{i2}$. In the illustrative embodiment, there is a relationship of $\omega_{i1} > \omega_{i2}$, so that a relationship of $T_{i1} < T_{i2}$ is obtained. The second hierarchical calculator 44 is thus longer in oscillation period than the first hierarchical calculator 42.

$\Lambda_{ij}(t)$ indicates a virtual phase obtained by falsely calculating in node i the phase of nonlinear oscillation in the second hierarchical calculator 44 of neighboring node j. The virtual phase $\Lambda_{ij}(t)$ is calculated by the virtual node model calculator 56 in the second hierarchical calculator 44 of node i, based on an impulse signal received from neighboring node j. The method of calculation of the virtual phase $\Lambda_{ij}(t)$ by the virtual node model calculator 56 will be described in detail later.

The phase difference $\Delta\Lambda_{ij}(t)$ is obtained by subtracting the phase $\lambda_i(t)$ of node i from the virtual phase $\Lambda_{ij}(t)$ relative to the second hierarchical calculator 44 of neighboring node j. For convenience, a value of the addition of $2\pi$ to the phase difference $\Delta\Lambda_{ij}(t)$ is replaced with its remainder after division by $2\pi$ so that the phase difference $\Delta\Lambda_{ij}(t)$ has a value of $0 \leq \Delta\Lambda_{ij}(t) < 2\pi$.

The function $G_2(\Delta\Lambda_{ij}(t))$ indicates a response characteristic that varies the rhythm of oscillation in the second hierarchical calculator 44 of node i in response to the phase difference $\Delta\Lambda_{ij}(t)$. The response characteristics indicated by the function $G_2(\Delta\Lambda_{ij}(t))$ vary between the case of both nodes i and j being non-bypass nodes (i, j$\in$NBP) and the other cases.

The NBP indicates a set of non-bypass nodes.

The function $H_2(\Delta\Lambda_{ij}(t))$ has a dynamic characteristic that varies the phase $\lambda_i(t)$ of node i in a direction of causing it to coincide with the virtual phase $\Lambda_{ij}(t)$ of neighboring node j. The function $H_2(\Delta\Lambda_{ij}(t))$ with such a characteristic is realized, for example, by a sinusoidal function $\sin(\Delta\Lambda_{ij}(t))$ or the following Expression (13):

$$H_2(\Delta\Lambda_{ij}(t)) = \begin{cases} \frac{1}{\pi}\Delta\Lambda_{ij} & 0 \leq \Delta\Lambda_{ij}(t) < \pi \\ \frac{1}{\pi}\Delta\Lambda_{ij}(t) - 2\pi & \pi \leq \Delta\Lambda_{ij}(t) < 2\pi \end{cases} \qquad (13)$$

However, the function $H_2(\Delta\Lambda_{ij}(t))$ is not limited to these forms.

On the other hand, the function $R_2(\Delta\Lambda_{ij}(t))$ has a dynamic characteristic that varies the phase $\lambda_i(t)$ of node i in a direction of repelling it from the virtual phase $\Lambda_{ij}(t)$ of neighboring node j. A specific example of the function $R_2(\Delta\Lambda_{ij}(t))$ with such a characteristic can be obtained by the same method of calculation as the function $R_1(\Delta\Theta_{ij}(t))$. For the details, see the aforementioned '619 JP publication. In the function $G_2(\Delta\Lambda_{ij}(t))$, a constant parameter for determining an equal phase difference is assumed to be $p_2$. The constant parameter $p_2$ represents the number of divisions of one oscillation period $T_{i2}$ in the second hierarchical calculator 44, its value being determined, for example, experimentally.

The function $G_2(\Delta\Lambda_{ij}(t))$ has the following two functions. That is to say, when nodes i and j are both non-bypass nodes, the function $G_2(\Delta\Lambda_{ij}(t))$ varies the phase $\lambda_i(t)$ of node i in a direction of causing it to coincide with the virtual phase $\Lambda_{ij}(t)$ of neighboring node j. In cases other than the above case, the function $G_2(\Delta\Lambda_{ij}(t))$ varies the phase $\lambda_i(t)$ of node i in a direction of repelling it from the virtual phase $\Lambda_{ij}(t)$ of neighboring node j.

The term of $\Sigma$ in Expression (10) represents the sum total of the function $G_2(\Delta\Lambda_{ij}(t))$ of neighboring node j. The indication $k_{H2}$ is a coupling coefficient parameter for determining the contribution of the function $H_2(\Delta\Lambda_{ij}(t))$ to the time evolution of the phase $\lambda_i(t)$, i.e. weight. Likewise, $k_{R2}$ is a coupling coefficient parameter for determining the contribution of the function $R_2(\Delta\Lambda_{ij}(t))$ to the time evolution of the phase $\lambda_i(t)$, i.e. weight. Their values are arbitrary and can be determined, for instance, experimentally.

The function $\xi_2(S_{i2}(t))$ is a stress response function that, when a relative phase difference PD2 between node i and its neighboring node j is small, cumulates stress and produces a phase shift of random magnitude responsive to a stress value $S_{i2}(t)$ cumulated. The relative phase difference PD2 is defined by the following Expression (14):

$$PD2 = \Delta\Lambda_{ij}(t) \text{ at the } \Delta\Lambda_{ij}(t) \leq \pi$$

$$PD2 = 2\pi - \Delta\Lambda_{ij}(t) \text{ at the } \Delta\Lambda_{ij}(t) > \pi \quad (14)$$

That is, the function $\xi_2(S_{i2}(t))$ is a function indicative of a response characteristic to the cumulated stress value $S_{i2}(t)$. The form of the function $\xi_2(S_{i2}(t))$ is prescribed by the same method of calculation as the above-described function $\xi_1(S_{i1}(t))$.

When nodes i and j are both non-bypass nodes (when i, j∈NBP), however, the second hierarchical calculator 44 does not reflect the relative phase difference PD2 on the calculation of the cumulated stress value $S_{i2}(t)$. This is because, in the case of non-bypass nodes, the function $G_2(\Delta\Lambda_{ij}(t))$ produces a dynamic action that varies the value of the relative phase difference PD so that it becomes zero. Thus, the stress response function $\xi_2(S_{i2}(t))$ operates only in cases other than non-bypass nodes.

In the illustrative embodiment, a collision rate is reflected on the phase $\theta_i(t)$ as the stress response function value and also the characteristic switching of the phase response function $R(\Delta\theta_{ij}(t))$ is reflected on the phase $\theta_i(t)$, but only the characteristic switching of the phase response function $R(\Delta\theta_{ij}(t))$ may be reflected on the phase $\theta_i(t)$.

The values of parameters $\omega_{i1}$ and $\omega_{i2}$ are decided so that they meet the following Expression (15). In Expression (15) a constant parameter m is an integer. Therefore, the ratio of oscillation periods between the first hierarchical calculator 42 and the second hierarchical calculator 44 at the convergence state is $T_{i2}/T_{i1} = m$. In the illustrate embodiment, the integer m is decided so that it meets the following Expression (16). In Expression (16), a constant parameter n is an integer and a constant parameter $p_2$ determines an equal phase difference in the function $R_2(\Delta\Lambda_{ij}(t))$.

$$\omega_{i1}/\omega_{i2} = m \quad (15)$$

$$m = np_2 \quad (16)$$

Thus, by making the integer m equal to an integer times constant parameter $p_2$, the processing related to a function $F_2(\theta_i(t), \lambda_i(t), \{\Theta_{ij}(t)|^\forall j\}, \{\Lambda_{ij}(t)|^\forall j\})$ can be made a relatively simple form.

The function $F_2(\theta_i(t), \lambda_i(t), \{\Theta_{ij}(t)|^\forall j\}, \{\Lambda_{ij}(t)|^\forall j\})$ has the function of forming a constant phase relationship between the first and second hierarchical calculators 42 and 44 of its own node i. $\{\Theta_{ij}(t)|^\forall j\}$ represents a set of "virtual phases $\Theta_{ij}(t)$ relative to all neighboring nodes j, where j=1, 2, 3, ...," generated in the first hierarchical calculator 42 of node i and indicates that all elements of this set are independent variables of the function $F_2(\theta_i(t), \lambda_i(t), \{\Theta_{ij}(t)|^\forall j\}, \{\Lambda_{ij}(t)|^\forall j\})$, i.e. input variables to the function. Similarly, $\{\Lambda_{ij}(t)|^\forall j\}$ represents a set of "virtual phases $\Lambda_{ij}(t)$ relative to all neighboring nodes j, where j=1, 2, 3, ...," generated in the second hierarchical calculator 44 of node i and indicates that all elements of this set are independent variables of the function $F_2(\theta_i(t), \lambda_i(t), \{\Theta_{ij}(t)|^{550} j\}, \{\Lambda_{ij}(t)|^\forall j\})$.

The expression "virtual phases relative to all neighboring nodes j, where j=1, 2, 3, ...," means the "virtual phases relative to all neighboring nodes j" lying within an interaction range of node i, i.e. within a range that an impulse signal from node i reaches. Therefore, the function $F_2(\theta_i(t), \lambda_i(t), \{\Theta_{ij}(t)|^\forall j\}, \{\Lambda_{ij}(t)|^\forall j\})$ operates by employing not only the values of the phases $\theta_i(t)$ and $\lambda_i(t)$ of the first and second hierarchical calculators 42 and 44 of node i, but also the values of the virtual phases $\{\Theta_{ij}(t)|^\forall j\}$ and $\{\Lambda_{ij}(t)|^\forall j\}$ relative to all neighboring nodes j lying within the interaction range. In the following, a virtual phase will be referred to simply as a phase.

The representation $k_{p2}$ is a coupling constant parameter that determines the contribution of the function $F_2(\theta_i(t), \lambda_i(t), \{\Theta_{ij}(t)|^\forall j\}, \{\Lambda_{ij}(t)|^\forall j\})$ to the time evolution of the phase $\lambda_i(t)$, i.e., weight, and its value is decided, for example, experimentally. The processing related to Expressions (10) through (12) is carried out according to the following steps. A specific function form of the function $F_2(\theta_i(t), \lambda_i(t), \{\Theta_{ij}(t)|^\forall j\}, \{\Lambda_{ij}(t)|^\forall j\})$ will hereinafter be disclosed.

Step 1: Let the value of the coupling constant parameter $k_{p2}$ at the operation starting point of node i be $k_{p2} = 0$. That is, at the operation starting point of node i, a connection relationship between the first and second hierarchical calculators 42 and 44 is once removed and phase relationships are formed between nodes independently of each other. In the second hierarchical calculator 44, step 1 is executed by the functions other than the function $F_2(\theta_i(t), \lambda_i(t), \{\Theta_{ij}(t)|^\forall j\}, \{\Lambda_{ij}(t)|^{550} j\})$ in Expressions (10) through (12). The first hierarchical calculator 42 executes step 1 by operating as usual, because it is configured to operate without being influenced by the second hierarchical calculator 44.

Step 2: Detect the state in which, in each of the first and second hierarchical calculators 42 and 44, an approximately equal phase difference with other nodes is formed. This detection can be processed in the same manner as the method of determining a steady state in the tuning determiner 28. If it is detected that the first hierarchical calculator 42 and second hierarchical calculator 44 are in their steady states independently of each other, the coupling constant parameter $k_{p2}$ is made $k_{p2} \neq 0$, whereby the function $F_2(\theta_i(t), \lambda_i(t), \{\Theta_{ij}(t)|^\forall j\}, \{\Lambda_{ij}(t)|^\forall j\})$ operates its function of forming a phase relationship between the first hierarchical calculator 42 and the second hierarchical calculator 44.

Step 3: In this step, a relative phase difference $\Gamma(\theta_i(t), m\lambda_i(t))$ between phases $\theta_i(t)$ and $m\lambda_i(t)$ is first calculated. Then, a relative phase difference $\Gamma(\theta_i(t), m\Lambda_{ij}(t))$ between phases $\theta_i(t)$ and $m\Lambda_{ij}(t)$ is calculated for all neighboring nodes j. $m\lambda_i(t)$ denotes a value of m times phase $\lambda_i(t)$, while $m\Lambda_{ij}(t)$ denotes a value of m times phase $\Lambda_{ij}(t)$. In the following description, a value of m times phase will also be referred to simply as a phase. The phase $m\lambda_i(t)$ is replaced by its remainder after division by $2\pi$ so that it always has a value of $0 \leq m\lambda_{ij}(t) < 2\pi$. The phase $m\Lambda_{ij}(t)$ is likewise replaced with its remainder after division by $2\pi$ so that it always has a value of $0 \leq m\Lambda_{ij}(t) < 2\pi$. The definition of the relative phase differences are the same as the aforementioned. Next, the sum total $\text{Sum}_i(t)$ of the relative phase differences is calculated by employing the following Expression (17):

$$\text{Sum}_i(t) = \Gamma(\theta_i(t), m\lambda_i(t)) + \sum_j \Gamma(\theta_i(t), m\Lambda_{ij}(t)) \quad (17)$$

As for the sum total $\text{Sum}_i(t)$, only one value is calculated with respect to its own node i.

Next, a relative phase difference $\Gamma(\Theta_{ik}(t), m\Lambda_{ij}(t))$ between a phase $\Theta_{ik}(t)$ relative to neighboring node k and a phase $m\Lambda_{ij}(t)$ relative to neighboring node j is calculated for all combinations of nodes k and j. Next, the sum total $\text{Sum}_k(t)$ of the relative phase differences $\Gamma(\Theta_{ik}(t), m\Lambda_{ij}(t))$ added for all nodes j by using the following Expression (18):

$$\text{Sum}_k(t) = \sum_j \Gamma(\Theta_{ij}(t), m\Lambda_{ij}(t)) \quad (18)$$

As for the sum total $\text{Sum}_k(t)$, respective values are calculated for individual nodes k.

Next, a node number u that has a minimum value among the sum total $\text{Sum}_i(t)$ and sum totals $\text{Sum}_k(t)$ is calculated by the following Expression (19):

$$u = \arg[\min_{i,k}(\text{Sum}_i(t), \text{Sum}_k(t) |^\forall k)] \quad (19)$$

The node number u is a number indicative of any one of node i and all nodes k.

Step 4: Using Expressions (10) through (12), calculations prescribing the time evolution of the phase $\lambda_i(t)$ are executed. At this time, the value of the function $F_2(\theta_i(t), \lambda_i(t), \{\Theta_{ij}(t) |^\forall j\}, \{\Lambda_{ij}(t) |^\forall j\})$ is calculated by the node number u obtained by Expression (19) and the following Expression (20):

$$F_2(\theta_i(t), \lambda_i(t), \{\Theta_{ij}(t) |^\forall j\}, \{\Lambda_{ij}(t) |^\forall j\}) = \begin{cases} f_2((\theta_i(t) - m\lambda_i(t)) & u = i \\ f_2((\Theta_{iu}(t) - m\lambda_i(t)) & u \neq i \end{cases} \quad (20)$$

In Expression (20), the function $f_2$ has a characteristic that makes the phase difference $\theta_i(t) - m\lambda_i(t)$ or phase difference $\Theta_{iu}(t) - m\lambda_i(t)$ equal to 0 and is able to employ, for instance, the following Expression (21):

$$f_2(x) = \begin{cases} \dfrac{1}{\pi}x & 0 \leq x < \pi \\ \dfrac{1}{\pi}(x - 2\pi) & \pi \leq x < \pi \end{cases} \quad (21)$$

However, the function $f_2$ is not limited to the form of Expression (21). The phase difference $\theta_i(t) - m\lambda_i(t)$ is replaced by its remainder after division by $2\pi$ so that it has a value of $0 \leq \theta_i(t) - m\lambda_i(t) < 2\pi$. Similarly, the phase difference $\Theta_{iu}(t) - m\lambda_i(t)$ is replaced by its remainder after division by $2\pi$ so that it has a value of $0 \leq \Theta_{iu}(t) - m\lambda_i(t) < 2\pi$.

By virtue of the fact that the function $f_2$ has a characteristic of making the phase difference $\theta_i(t) - m\lambda_i(t)$ or phase difference $\Theta_{iu}(t) - m\lambda_i(t)$ equal to 0, a constant phase relationship is formed between the first hierarchical calculator 42 and the second hierarchical calculator 44 without node i destroying a phase relationship between itself and its neighboring node j. This is due to a relationship that repeats a sequence of operations such as "During the time period in which the second hierarchical calculator 44 advances a phase by one oscillation period, the first hierarchical calculator 42 advances a phase by m oscillation periods so that two phases $\theta_i(t)$ and $\lambda_i(t)$ coincide with each other". This relationship means that they are synchronized with each other at intervals of an integer ratio of m:1.

Thus, if the first hierarchical calculator 42 and second hierarchical calculator 44 form unequal phase differences between its own node and its neighboring node, respectively, and form a relationship in which both are synchronized with each other at intervals of an oscillation period of an integer ratio, then it becomes possible to realize unequal time-slot allocation based on a multiplexed oscillation period structure.

The state manager 46 has the function of managing phase states in the multiplexed oscillation period structure to execute unequal time-slot allocation. An important feature of the illustrative embodiment resides in that a ratio in making time-slot allocation unequal can be controlled in various ways by this function of the state manager 46. Specific operation of the state manager 46 will be described later.

Thus, in the second hierarchical calculator 44, expressions (10) (11) and (12) are solved using a numerical approximation technique for solving differential equations, such as the Runge-Kutta method, and can be installed in each node as software. Using difference equations obtained from differential equations by other methods simpler than the Runge-Kutta method, it is also possible to calculate changes in a state variable. Besides, if circuitry is configured to operate in the same manner as Expressions (10) through (12), then it can be installed in each node as hardware.

Now, a method of calculation of the virtual phase $\Lambda_{ij}(t)$ by the virtual node mode calculator 56 in the second hierarchical calculator 44 will be disclosed. Operation of the virtual node mode calculator 56 is deeply related to a method of transmitting impulse signals. Hence, before disclosing the calculation method of the virtual phase $\Lambda_{ij}(t)$, the transmission method of impulse signals in the illustrative embodiment will be described.

Although a description will be given on the assumption that a node identification number, that is, ID information is not added to an impulse signal, the virtual phase $\Lambda_{ij}(t)$ can be calculated in the same manner even when a node identification number is added to an impulse signal.

A normal node functions to transmit an impulse signal based on the phase $\theta_i(t)$ of nonlinear oscillation in the first hierarchical calculator 42 of its own node. More specifically, it transmits an impulse signal when the phase $\theta_i(t)$ is, for example, at a particular value such as 0. Thus, an impulse signal is transmitted at the oscillation period of the first hierarchical calculator 42. In addition, an impulse signal to be transmitted by each node is given identification information indicating that its own node is a normal node.

On the other hand, in bypass and non-bypass nodes, the transmission methods of an impulse signal vary between a convergence process being in a transitional state and a convergence state being in a steady state. The convergence state used herein refers to a state determined to be "a second convergence state" by a second stage convergence decision in the convergence determiner 34 that is to be described later. On the other hand, the convergence process similarly means a state not determined to be the second convergence state. In the following, when a convergence process or convergence state is simply expressed, it denotes the same meaning.

Now, the impulse signal transmission methods in bypass and non-bypass nodes will be described.

An impulse signal in the convergence process is transmitted based on the phase $\theta_i(t)$ of nonlinear oscillation in the first hierarchical calculator 42 of its own node i. More specifically, when the phase $\theta_i(t)$ is, for instance, at a particular value such as zero, an impulse signal is transmitted. Thus, an impulse signal is transmitted at the oscillation period of the first hierarchical calculator 42. Further, an impulse signal to be transmitted by each node is given a plurality of pieces of information. The first information is the phase $\lambda_i(t)$ of nonlinear oscillation in the second hierarchical calculator 44 of its own node i. More specifically, it is the value of the phase $\lambda_i(t)$ at the transmission time t of an impulse signal. At this time, since there is a relationship of parameter $\omega_{i1}(t) > \omega_{i2}(t)$, that is, a relationship of oscillation period $T_{i1}(t) > T_{i2}(t)$, the value of the phase $\lambda_i(t)$ added to an impulse signal has a discrete value of $0 \leq \lambda_i(t) < 2\pi$. The second information is identification information indicating that its own node i is one of the two bypass and non-bypass nodes.

The transmission methods of an impulse signal in the convergence state vary between two cases. The meanings of time periods in the two cases will be described later.

The first case is the time period in which all nodes within an interaction range have a time slot and is the same as the impulse-signal transmission method in the convergence process. The second case is the time period in which only bypass nodes within an interaction range have time slots, and during this time period, impulse-signal transmission is stopped in non-bypass nodes. Only in the case of bypass nodes, an impulse signal is transmitted based on the phase $\lambda_i(t)$ of nonlinear oscillation in the second hierarchical calculator 44 of its own node. More specifically, when the phase $\lambda_i(t)$ is, for instance, at a particular value such as zero, an impulse signals is transmitted. Thus, an impulse signal is transmitted at the oscillation period of the second hierarchical calculator 44. An impulse signal to be transmitted by each node is not given information.

Next, at the virtual phase $\Lambda_{ij}(t)$ calculated by the virtual node model calculator 56, in the case of the "time period in which all nodes within an interaction range have a time slot" in the convergent process and convergent state, all nodes each transmit an impulse signal. When the phase $\theta_i(t)$ of nonlinear oscillation in the first hierarchical calculator 42 of its own node i is at a particular value such as zero, an impulse signal is transmitted. The virtual node mode calculator 56 in the second hierarchical calculator 44 of its own node i employs the "phase $\lambda_i(t)$ in the second hierarchical calculator 44 of neighboring node j" added to an impulse signal received from neighboring node j. Next, the method of calculation of the virtual phase $\Lambda_{ij}(t)$ employing the phase $\lambda_j(t)$ will be described.

After receiving an impulse signal from neighboring node j, the second hierarchical calculator 44 of its own node i generates the virtual phase model of the source node j. This processing is carried out in response to the generation of a virtual phase model in the first hierarchical calculator 42. More particularly, it is executed when predetermined conditions to generate a virtual phase model are met in the first hierarchical calculator 42. Therefore, interiorly of node i, virtual phase models of its neighboring node j are formed so that they are paired with the first hierarchical calculator 42 and second hierarchical calculator 44. Such a pair of virtual phase models of the same neighboring node j is kept in a state in which they can correspond to each other by forming a connection relationship. However, when neighboring node j is a normal node, the second hierarchical calculator 44 does not generate a virtual phase mode for this node j. Thus, a virtual phase model for a normal node is generated only in the first hierarchical calculator 42.

On the other hand, virtual phase models for bypass and non-bypass nodes are generated in both the first hierarchical calculator 42 and second hierarchical calculator 44. In the first hierarchical calculator 42 of its own node i, when conditions to extinguish some virtual phase model are met, the second hierarchical calculator 44 extinguishes its corresponding virtual phase model connected with that virtual phase model at the same time. Thus, even in the case where paired virtual phase models are extinguished, existing virtual phase models are kept in a state in which they are paired with the first hierarchical calculator 42 and second hierarchical calculator 44.

The simplest example of a virtual phase model to be generated in the second hierarchical calculator 44 can be expressed by the following Expression (22):

$$\frac{d\Lambda_{ij}(t)}{dt} = \Omega_{ij2} \tag{22}$$

In Expression (22), $\Lambda_{ij}(t)$ has a value of $0 \leq \Lambda_{ij}(t) < 2\pi$. The parameter $\Omega_{ij2}$ represents a virtual phase model parameter relative to neighboring node j in node i. The parameter $\Omega_{ij2}$ is called a virtual natural angular frequency parameter. As the simplest example of the virtual natural angular frequency parameter $\Omega_{ij2}$, it is set to the same value as the natural angular frequency parameter $\omega_{i2}$ of node i. However, in this case, the natural angular frequency parameter $\omega_{i2}$ of each node has been set to the same value beforehand in the entire system.

Expression (22) means that the virtual phase $\Lambda_{ij}(t)$ for neighboring node j is calculated by using a mathematical model, complying with a time evolution rule, which represents a phenomenon that oscillates at a constant rhythm given by the virtual natural angular frequency parameter $\Omega_{ij2}$. An initial phase in calculating the virtual phase $\Lambda_{ij}(t)$, that is, an initial value employs the value of the phase $\lambda_j(t)$ added to an impulse signal received from neighboring node j. Thereafter, every time an impulse signal is received from neighboring node j, the value of the virtual phase $\Lambda_{ij}(t)$ at that time is reset to the value of the phase $\lambda_j(t)$, and $\Lambda_{ij}(t)$ is calculated based on Expression (22). In this manner, the virtual phase $\Lambda_{ij}(t)$ for neighboring node j is calculated.

Expression (22) can be installed in each node as software by using difference equations (i.e. recurrence equations) obtained from differential equations by converting a continuous time variable to discrete time. In addition, if circuitry is configured to operate the same as Expression (22), then it can be installed in each node as hardware.

Next, in the event of the "time period in which only bypass nodes within an interaction range have time slots" in the convergence state, only a bypass node transmits an impulse signal. Bypass node j transmits an impulse signal when the phase $\lambda_j(t)$ in the second hierarchical calculator 44 is, for instance, at a particular value such as zero.

The virtual node model calculator 56 in the second hierarchical calculator 44 of its own node i performs calculations based on Expression (22) that represents a virtual phase model generated during the "time period in which all nodes within an interaction range have a time slot" in the aforementioned convergent process and convergence state, thereby calculating the value of the virtual phase $\Lambda_{ij}(t)$. However, each time an impulse signal is received from bypass node j that is a neighboring node, the value of a virtual phase $\Lambda_{ij}(t)$ for this node at that time is reset to a particular value (e.g. zero) of the phase $\lambda_j(t)$, whereby calculations are made based on Expression (22).

Now, a description will be given of a form that realizes time-slot allocation according to the present invention. The aforementioned function of the state manager 46 makes it possible to variously control a ratio in making time-slot allocation unequal.

The function $R_1(\Delta\Theta_{ij}(t))$ in Expression (1) and function $R_2(\Delta\Lambda_{ij}(t))$ in Expression (10) employ a phase response function, described in the aforementioned '619 JP publication, which is used to form an unequal phase difference. This phase response function has a constant parameter p that determines the number of divisions of one oscillation period corresponding to the number of time slots, and $p_1$ and $p_2$ represent the numbers of divisions of one oscillation period corresponding to the functions $R_1(\Delta\Theta_{ij}(t))$ and $R_2(\Delta\Lambda_{ij}(t))$, respectively. The values of the constant parameters $p_1$ and $p_2$ are determined, for example, experimentally.

Figure 7A:
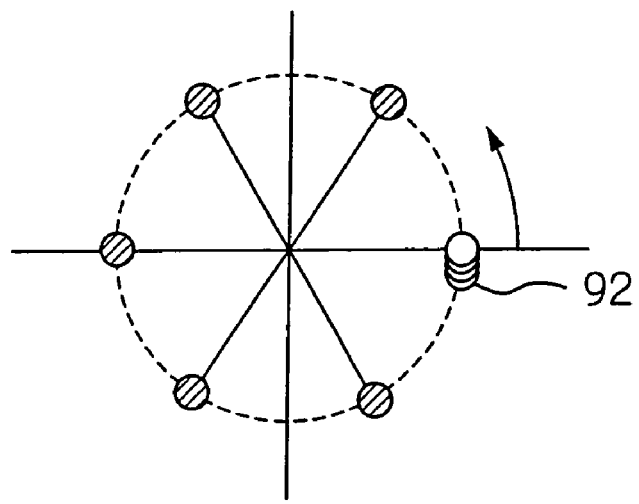
FIGS. 7A through 9B demonstrate the phase relationships between nodes within the interaction range which are formed in the virtual node model calculator of FIG. 3.

In directing attention now to some bypass node, the simplest example of a phase relationship between nodes within an interaction range in the convergence state is shown in FIGS. 7A through 9B. A phase relationship in FIGS. 7A and 7B is an example when the constant parameters $p_1$ and $p_2$ are 9 and 6 ($p_1$=9 and $p_2$=6). FIG. 7A indicates a phase relationship that is formed in the second hierarchical calculator 44, while the lower portion indicates a phase relationship that is formed in the first hierarchical calculator 42. In FIG. 7B, the first hierarchical calculator 42 forms a phase relationship in which one oscillation period is divided into $p_1$ equal parts, e.g. nine equal parts, while in FIG. 7A the second hierarchical calculator 44 forms a phase relationship in which one oscillation period is divided into $p_2$ equal parts, e.g. six equal parts.

Figure 7B:
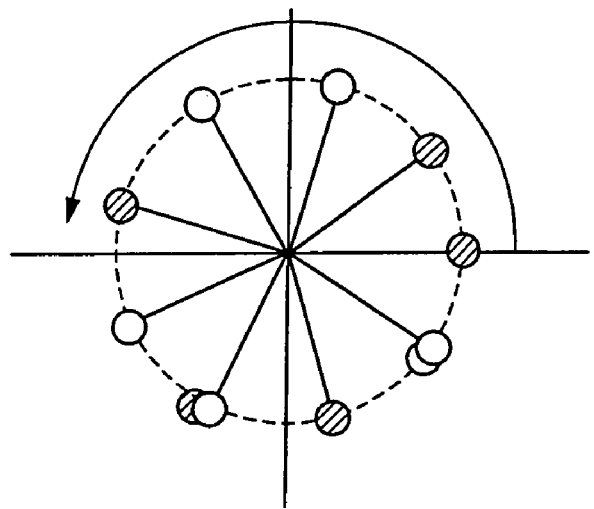

In FIGS. 7A and 7B, hatched circles indicate phase states of bypass nodes, while open circles indicate phase states of non-bypass nodes. Furthermore, in the second hierarchical calculator 44, a portion 92 in which non-bypass nodes overlap one another represents an operating state in which a plurality of nodes are the same in phase.

The state manager 46 functions to manage both states of the first hierarchical calculator 42 and second hierarchical calculator 44 shown in FIGS. 7A and 7B and recognize a time slot at its own node based on both states of the first hierarchical calculator 42 and second hierarchical calculator 44.

Now, some time in the state of FIGS. 7A and 7B is set, for example, to t=$t_0$. FIGS. 8A through 9B illustrate the states at time t=$t_0$+$W_{i2}$ and time t=$t_0$+$T_{i2}$, respectively. An oscillation period $T_{i2}$ represents the oscillation period of the second hierarchical calculator 44 at the convergence state and, in FIGS. 7A through 9B, corresponds to a period of rotation. A value $W_{i2}$ represents a value of one oscillation period in the second hierarchical calculator 44 divided by the number of divisions $p_2$, or a time interval $W_{i2}=T_{i2}/p_2$.

Figure 8A:
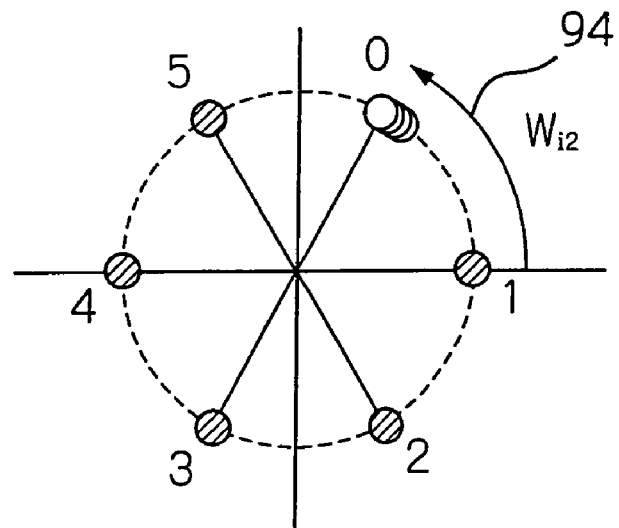

Next, operation during the time period from time t=$t_0$ to time t=$t_0$+$W_{i2}$ will be disclosed. A group of non-bypass nodes indicated by open circles in the second hierarchical calculator 44 advances a phase from 0 to $2\pi/p_2$. That is, as illustrated in FIG. 8A, the second hierarchical calculator 44 advances the phase by a quantity indicated with an arrow 94. On the other hand, the first hierarchical calculator 42 in FIG. 8B advances a phase by n oscillation periods during the same time period, so that the phase makes n rotations along a circle. That is, the phase advanced by the second hierarchical calculator 44, $W_{i2}$, can be expressed as $W_{i2}=T_{i2}/p_2=nT_{i1}$.

The parameter n is determined so that it satisfies the following Expression (23):

$$n=\tau(p_2-1)+1 \quad \tau=0,1,2,\ldots \quad (23)$$

Figure 8B:
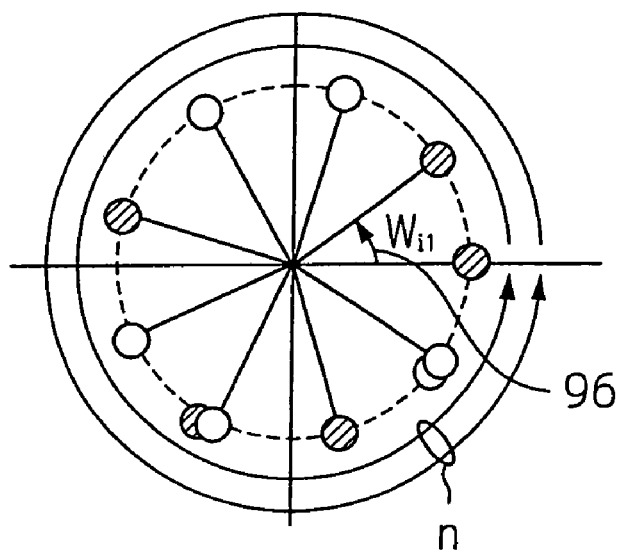

In the example of FIGS. 8A and 8B, the constant parameter $p_2$ is 6. Therefore, when $\tau$=1, the parameter n is 6. By making the value of the parameter $\tau$ variable, the value of the parameter n can be variously changed.

In the time period in which the first hierarchical calculator 42 advances a phase by n oscillation periods, the first oscillation period ($T_{i1}$) is set to the time period in which all nodes within an interaction range have a time slot. In the first oscillation period, each node acquires as a time slot the time period ($W_{i1}$) shown in FIG. 8B in which one oscillation period ($T_{i1}$) of the first hierarchical calculator 42 is divided into $p_1$ equal parts, i.e. $W_{i1}=T_{i1}/p_1$, which is the time period in which the phase is advanced by a quantity indicated by an arrow 96. The oscillation period $T_{i1}$ corresponds to the period of rotation (one rotation) of the first hierarchical calculator 42 at the convergence state.

The subsequent second oscillation period ($T_{i1}$) is set to the time period in which node 1 of the second hierarchical calculator 44 in FIG. 8A acquires a time slot, and the subsequent third oscillation period ($T_{i1}$) is set to the time period in which node 2 of the second hierarchical calculator 44 in FIG. 8A acquires a time slot. Thereafter, nodes 3 and 4 likewise acquire a time slot, and in the sixth oscillation period ($T_{i1}$), node 5 of the second hierarchical calculator 44 in FIG. 8A acquires a time slot.

In the event of $p_2$=6 and $\tau$=1, the value n is 6. This case is up to the sixth oscillation period. However, when $p_2$=6 and $\tau \geq 2$, the value n is 11 or greater. In this case, in the seventh and eighth oscillation periods, like nodes 1 and 2 of the second hierarchical calculator 44 in FIG. 8A, bypass nodes again acquire a time slot in order.

Thus, in the second oscillation period and subsequent oscillation periods, in accordance with the order prescribed by a phase relationship between nodes formed in the second hierarchical calculator 44, only bypass nodes acquire a time slot in order. Therefore, in the time period in which the first hierarchical calculator 42 advances a phase by n oscillation periods, each of the oscillation periods other than the first oscillation period is a time period in which only bypass nodes acquire a time slot. The length of this time period can be variously changed by making the value of the parameter $\tau$ variable.

Figure 9A:
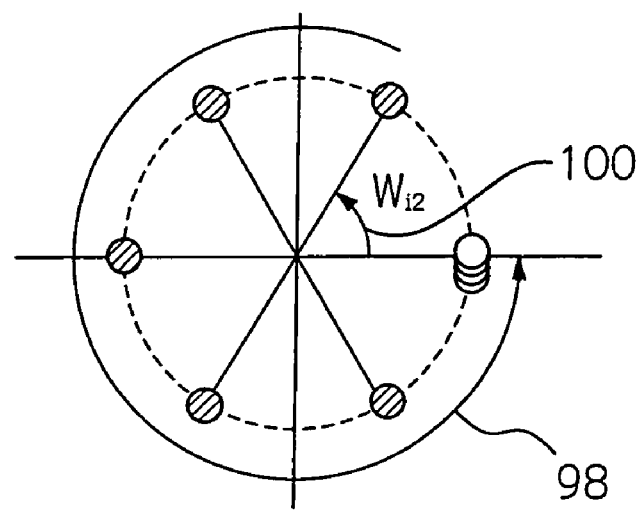
Figure 9B:
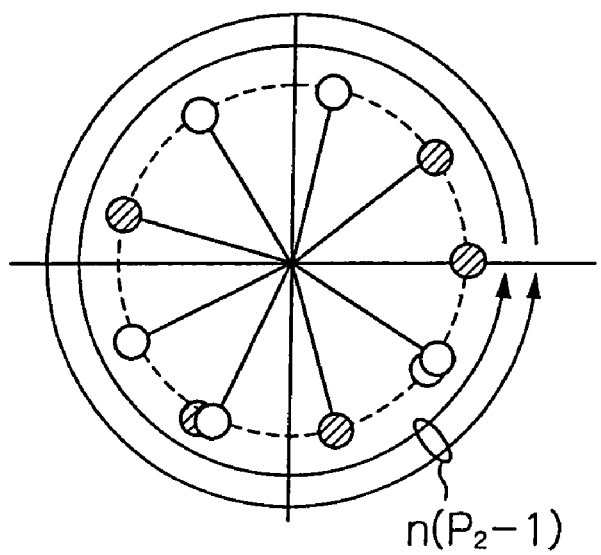

Next, during the time period from time t=$t_0$+$W_{i2}$ to time t=$t_0$+$T_{i2}$, a group of non-bypass nodes indicated by open circles in the second hierarchical calculator 44 advances the phase from $2\pi/p_2$ to $2\pi$, as shown in FIG. 9A. That is, the second hierarchical calculator 44 advances the phase by a quantity indicated with an arrow 98. On the other hand, the first hierarchical calculator 42 rotates along a circle during the same time period and advances the phase by $n(p_2-1)$ oscillation periods. For example, in the case of $p_2=6$ and $\tau=1$, the value n is 6 and therefore the value $n(p_2-1)$ is 30. As a result, the first hierarchical calculator 42 advances the phase by 30 oscillation periods. In the case of $p_2=6$ and $\tau=2$, the value n is 11 and therefore the value $n(p_2-1)$ is 55. As a result, the first hierarchical calculator 42 advances the phase by 55 oscillation periods. This time period is set to the time period in which only bypass nodes acquire time slots. Each node acquires as a time slot the time period ($W_{i2}$) shown in FIG. 9A in which one oscillation period ($T_{i2}$) of the second hierarchical calculator 44 is divided into $p_2$ equal parts (i.e., $W_{i2}=T_{i2}/p_2=nT_{i1}$, which is the time period in which the phase is advanced by a quantity indicated with an arrow 100).

Thus, depending upon the value of the parameter $\tau$, a ratio of time slots allocated to non-bypass and bypass nodes varies.

It is described that the operation of the second hierarchical calculator 44, as shown in Expression (15), is determined so that the ratio of the natural angular frequency parameters in the first hierarchical calculator 42 and second hierarchical calculator 44 becomes $\omega_{i1}/\omega_{i2}=m$, where m is an integer. This corresponds to making the ratio of oscillation periods at the convergence state equal to $T_{i2}/T_{i1}=m$. That is, this means that the first hierarchical calculator 42 advances a phase by m oscillation periods during the time period in which the second hierarchical calculator 44 advances a phase by only one oscillation period. It is also disclosed that in Expression (16), this value m is determined so that it meets $m=n\,p_2$. This indicates that the ratio of oscillation periods is set to n times the number of divisions ($p_2$) of one oscillation period in the second hierarchical calculator 44.

The integer n in Expression (16) is determined so that it meets Expression (23). Therefore, the following Expression (24) is obtained:

$$m=\{\tau(p_2-1)+1\}p_2 \quad \tau=0,1,2,\ldots \quad (24)$$

Making the parameter $\tau$ variable changes the ratio of oscillation periods. The greater the parameter $\tau$ is made, the greater the ratio of oscillation periods becomes. This means that the rate of the time period in which only bypass nodes acquire time slots is relatively increased.

Figure 10:
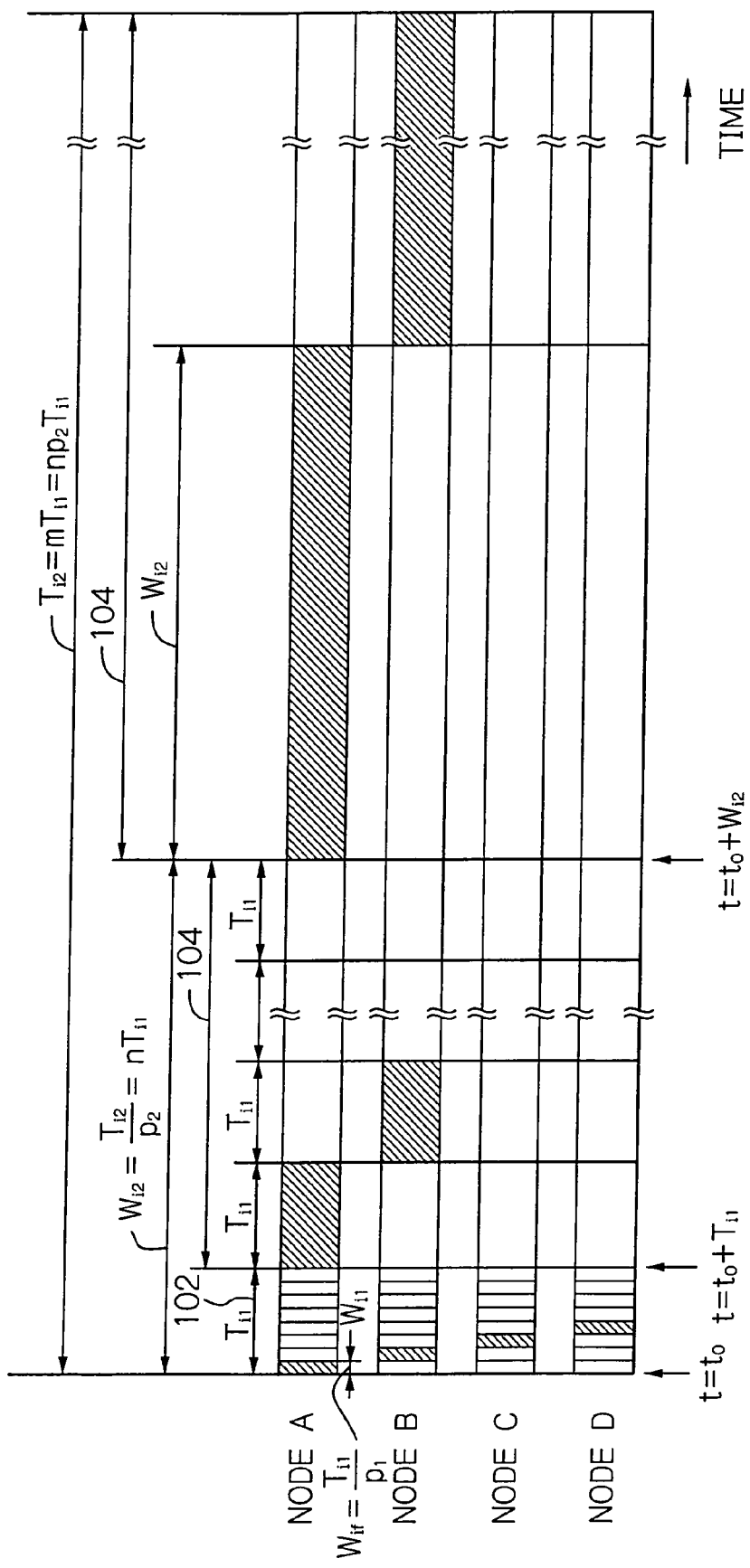
FIG. 10 is a timing chart useful for understanding how time slots are allocated to nodes.
Figure 11:
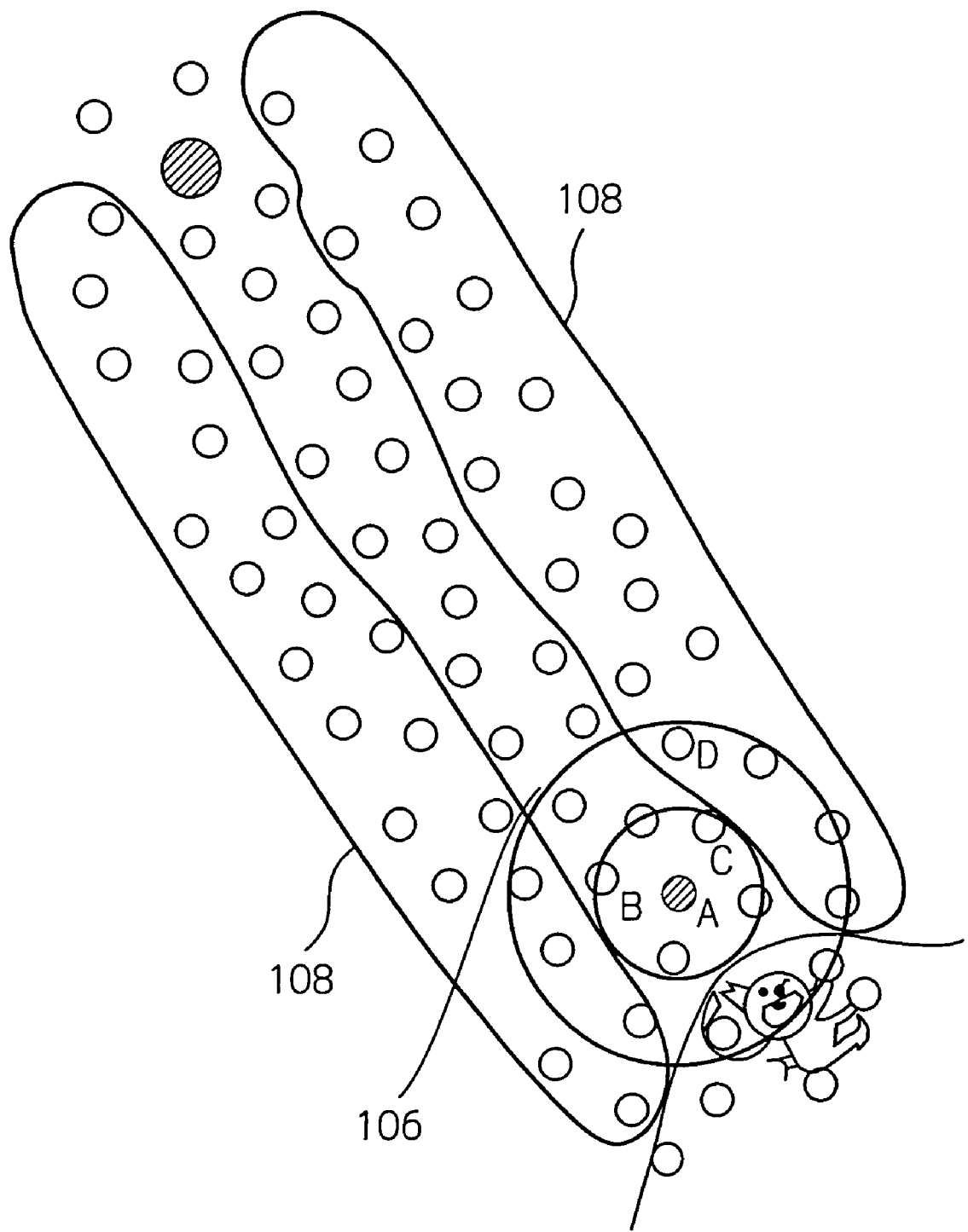
FIG. 11 illustrates how three categories of nodes are disposed.

Referring to FIG. 10, there is shown an example of time-slot allocation corresponding to the above-described operation in FIGS. 7A through 9B. Nodes A, B, C, and D in FIG. 10 correspond to nodes A, B, C, and D disposed as shown in FIG. 11. Nodes A through C are disposed within a bypass node area 106, while node D is disposed within a non-bypass node area 108. Nodes A through C may be considered to be nodes 1, 2, and 3 shown in FIGS. 7A through 9B, while node D may be considered as node 0 in FIGS. 7A through 9B.

The time period from time $t=t_0$ to time $t=t_0+W_{i2}$ consists of the time period 102 in which all nodes within an interaction range acquire a time slot and the time period 104 in which only bypass nodes acquire time slots, shown in FIG. 10. The subsequent time period from time $t=t_0+W_{i2}$ to time $t=t_0+T_{i2}$ indicates the time period 104 in which only bypass nodes acquire time slots.

Such a multiplexed time structure is periodically repeated. This structure makes it possible to considerably increase a transmission rate at which bypass nodes transmit impulse signals. The transmission rate of a non-bypass node is reduced, but transmission is by no means stopped. That is, while periodic transmission by non-bypass nodes is being assured, bypass nodes are capable of transmitting impulse signals at high rates.

Besides, in the illustrative embodiment, by making the parameter $\tau$ variable, it is possible to variously control the ratio of the time period 102 in which all nodes within an interaction range acquire a time slot and the time period 104 in which only bypass nodes acquire time slots. A greater parameter $\tau$ can relatively increase the rate of the "time period 104 in which only bypass nodes acquire time slots" that is present within the time period of one oscillation period $T_{i2}$. In principle the rate can be increased as much as you like. Thus, by causing the parameter $\tau$ to be variable, the illustrative embodiment makes it possible to variously control the ratio of time-slot allocation between bypass and non-bypass nodes.

Thus, according to the illustrative embodiment, it becomes possible to realize time-slot allocation that has various multiplexed time structures so as to meet requirements of various applications.

Returning to FIG. 2, the convergence determiner 34 has the function of determining whether to have converged based on the result of the processing obtained in the communication timing calculator 24. More specifically, the convergence determiner 34 determines whether or not the mutual adjustment of time-slot allocation between nodes within an interaction range has converged.

Note that the convergence determiner 34 is able to determine convergence in various ways. For instance, the convergence determiner 34 may output a convergence determination result in the following two stages, because each node determines convergence.

A first stage convergence decision corresponds to the aforementioned step 2 and detects the state in which, in the first hierarchical calculator 42, an approximately equal phase difference with other nodes is formed. It does not matter whether or not in the second hierarchical calculator 44 the same state is formed. This detection process, as described in step 2, can be carried out the same as the steady-state decision method in the tuning determiner 28.

As previously described, the first hierarchical calculator 42 is configured to operate without being influenced by the second hierarchical calculator 44. Therefore, in the first stage convergence decision, the "state in which, in the first hierarchical calculator 42, an approximately equal phase difference with other nodes is formed" is detected and this detected state is determined to be a first convergent state.

At the point where the first convergence state is detected, it is possible for the first hierarchical calculator 42 to begin data transmission based on time-slot allocation. That is, as in normal nodes, data communication based on equal time-slot allocation can be performed. However, when the "state in which, in the first hierarchical calculator 42, an approximately equal phase difference with other nodes is formed" is destroyed after data communication, i.e. when the condition of the first convergence state is no longer met, the data communication is stopped.

Next, a second stage convergence is determined. In the second stage convergence decision, when first and second conditions are both met, a second convergence state is determined. When the first and second conditions for the second convergence state are met, data transmission by unequal time-slot allocation employing both of the first and second hierarchical calculators 42 and 44 can be started. However, when the conditions are no longer met after data communication, the data communication is stopped. The operation of forming a phase relationship between nodes is again executed, and until the condition of the first convergence state or conditions of the second convergence state are met, data communication is not executed.

The first condition for the second convergence state is the state in which, in each of the first and second hierarchical calculators 42 and 44, an approximately equal phase difference with other nodes is formed. This state, for example, can be detected the same as the steady-state decision method in the tuning determiner 28. The second condition for the second convergence state is that, in Expressions (4) through (6), under the condition $k_{p2} \neq 0$, the state of the function $F_2(\theta_i(t), \lambda_i(t), \{\Theta_{ij}(t)|^{\forall}j\}, \{\Lambda_{ij}(t)|^{\forall}j\})=0$ continues for a predetermined time period or greater.

In the case of a normal node, the impulse signal transmitter 26 has the function of transmitting an impulse signal based on the phase $\theta_i(t)$ of nonlinear oscillation in the first hierarchical calculator 42 of its own node i. More specifically, it transmits an impulse signal when the phase $\theta_i(t)$ is, for example, at a particular value such as zero. Thus, an impulse signal is transmitted at the oscillation period of the first hierarchical calculator 42. Besides, an impulse signal to be transmitted by each node is given identification information indicating that its own node is a normal node.

On the other hand, in the event of bypass and non-bypass nodes, in the impulse signal transmitter 26, impulse-signal transmission methods vary between a convergence process in a transitional state and a convergence state in a steady state. An impulse signal in the convergence process is transmitted in the convergence process, based on the phase $\theta_i(t)$ of nonlinear oscillation in the first hierarchical calculator 42 of its own node i. More specifically, when the phase $\theta_i(t)$ is, for example, at a particular value such as zero, an impulse signal is transmitted. Thus, an impulse signal is transmitted at the oscillation period of the first hierarchical calculator 42.

Further, an impulse signal to be transmitted by each node is given two of pieces of information. The first information is the phase $\lambda_i(t)$ of nonlinear oscillation in the second hierarchical calculator 44 of its own node i. Stated another way, it is the value of the phase $\lambda_i(t)$ at the transmission time t of an impulse signal. At this time, since there is a relationship of natural angular frequency parameter $\omega_{i1}(t) > \omega_{i2}(t)$, that is, a relationship of oscillation period $T_{i1}(t) > T_{i2}(t)$, the value of the phase $\lambda_i(t)$ added to an impulse signal has a discrete value of $0 \leq \lambda_i(t) < 2\pi$. The second information is identification information indicating that its own node i is one of the two bypass and non-bypass nodes.

The transmission methods of an impulse signal in the convergence state vary between two cases. The first method is the same as the transmission method of an impulse signal in the convergence process that is used during the time period in which all nodes in an interaction range have a time slot. The second method is used only during the time period in which only bypass nodes in an interaction range have time slots and, during this time period, transmits an impulse signal based on the phase $\lambda_i(t)$ of nonlinear oscillation in the second hierarchical calculator 44 of its own node. In the case of non-bypass nodes, the second method stops the transmission of impulse signals. More specifically, when the phase $\lambda_i(t)$ is, for instance, at a particular value such as zero, an impulse signal is transmitted. Thus, an impulse signal is transmitted at the oscillation period of the second hierarchical calculator 44. An impulse signal to be transmitted by each node need not be given some information.

The impulse signal receiver 22 has the functions of receiving an impulse signal transmitted from its neighboring node j within an interaction range and detecting the information added to the impulse signal.

In the illustrative embodiment, in a data communication method in which a plurality of nodes transmit and receive impulse signals to mutually adjust time-slot allocation autonomously, the communication timing calculator 34 is equipped with a plurality of nonlinear oscillator models different in oscillation period, and causes these models to operate in cooperation with one another to carry out an interaction calculation that has a dynamic characteristic that forms a multiplexed phase relationship between nodes within an interaction range. This forms a time structure multiplexed between nodes within an interaction range, whereby it becomes possible to implement a telecommunications system that performs unequal time-slot allocation so that time slots can be allocated at high rates to particular nodes such as a bypass node, i.e. a telecommunications system in which the chances of transmission are unequally given between nodes. In this manner, while periodic transmissions by non-bypass nodes are being ensured, bypass nodes are capable of transmission at significantly high rates.

In addition, by making the value of the parameter $\tau$ variable, it is possible to variously control the ratio of the time period in which all nodes within an interaction range acquire a time slot and the time period in which only bypass nodes acquire time slots. A greater parameter $\tau$ can relatively increase the rate of the "time period in which only bypass nodes acquire time slots" that is present within the time period of one oscillation period $T_{i2}$. In principle the rate can be increased as much as you like. Thus, by causing the parameter $\tau$ to be variable, the illustrative embodiment makes it possible to variously control the ratio of time-slot allocation between bypass and non-bypass nodes. Consequently, it becomes possible to realize time-slot allocation that has various multiplexed time structures so as to meet requirements of various applications.

The illustrative embodiment employs Expression (1) as an expression that models nonlinear oscillation, but may use various types of oscillation models. For instance, the present invention may employ general models of nonlinear oscillation and chaotic oscillation, such as the van der Pol equation and other equations, which are disclosed in Morikazu Toda and Shinsuke Watanabe, "Nonlinear Dynamics", Kyoritsu Shuppan Co., Ltd. These models can be implemented regardless of whether interaction between nodes takes place, at discrete or pulse-like intervals with respect to time, or continuously.

The van der Pol equation is an expression modeling a nonlinear oscillatory phenomenon that occurs on electric circuits. Operation of the van der Pol equation can be installed in a node as hardware, using electronic circuits. It can also be installed in a node as software by employing, for instance, the Runge-Kutta method that is a numerical approximation technique for solving differential equations.

The present invention does not depend upon time, operating states, or a difference between description methods of individual models, such as a discrete model relating to interaction, a continuous model, and a model expressing a particular oscillatory phenomenon, but can be implemented by using various models whose operating state makes a transition according to some time evolution rule. A form employing a model whose operating state varies periodically or chaotically can be handled as an embodiment of the present invention.

While the present invention is directed to a specific form that employs impulse signals as interaction signals to be transmitted and received between nodes and incorporates a virtual node model calculator into the communication timing calculator 24, the present invention is not to be limited thereto.

Now, a description will be given of an alternative embodiment that applies the communication control apparatus of the present invention to a sensor network. The alternative embodiment is also configured to realize unequal time-slot allocation that allocates time slots at high rates to particular nodes such as a bypass node. The internal configuration and operation of each node are approximately the same as the preceding embodiment. The alternative embodiment may be the same as the preceding embodiment except for the operation of the state manager 46, FIG. 2, in the communication timing calculator 24. This causes a difference in time-slot allocation.

A time slot in each node is allocated by taking account of the states of a node and its neighboring nodes being managed by the state manager 46.

Nodes A, B, C, and D shown in FIG. 12 correspond to the example of the node disposition and interaction range shown in FIG. 10. In FIG. 12, the operation in the time period of an oscillation period $T_{i2}$ can be divided into two operations, first operation in a time period 110 from time $t=t_0$ from time $t=t_0+W_{i2}$ and second operation in a time period 104 from time $t=t_0+W_{i2}$ to time $t=t_0+T_{i2}$.

The first operation during the time period 110 is the same as the preceding embodiment, whereas the second operation during the time period 104 differs from the preceding embodiment. This operation during the time period 104 will be described. The time period 104 from time $t=t_0+W_{i2}$ to time $t=t_0+T_{i2}$ represents the time period in which only bypass nodes acquire time slots. In the preceding embodiment, each bypass node acquires $W_{i2}=T_{i2}/p_2=nT_{i1}$, which is obtained by dividing one oscillation period ($T_{i2}$) of the second hierarchical calculator 44 into $p_2$ equal parts, as a time slot. This time slot is the time period in which the second hierarchical calculator 44 advances a phase by the quantity indicated by the arrow 100 in FIG. 9A and, as clear from the above expression, is equivalent to n oscillation periods ($nT_{i1}$) of the first hierarchical calculator 42. In the alternative embodiment, the time slot ($nT_{i1}$) acquired by a single bypass node in the preceding embodiment is divided into n equal parts and then distributed among a plurality of bypass nodes. Namely, the time period of n oscillation periods ($nT_{i1}$) of the first hierarchical calculator 42 is distributed to a plurality of bypass nodes as a time slot expressed in units of one oscillation period ($T_{i1}$). Stated quite simply, each note acquires $T_{i1}$ as a time slot.

In such a time period of n oscillation periods, the first oscillation period is set to the time period in which a single bypass node, which has acquired a time slot in the preceding embodiment, similarly acquires a time slot. The subsequent second oscillation period is set to the time period in which node 1 of the second hierarchical calculator 44 in FIG. 8A acquires a time slot, and the subsequent third oscillation period is set to the time period in which node 2 of the second hierarchical calculator 44 in FIG. 8A acquires a time slot. Likewise, the fourth, fifth, and sixth oscillation periods are set to the time periods in which nodes 3 through 5 of the second hierarchical calculator 44 in FIG. 8A acquire a time slot.

In the case of $p_2=6$ and $\tau=1$, the value n is 6. This case is up to the sixth oscillation period. However, when $p_2=6$ and $\tau \geq 2$, the value n is 11 or greater. In this case, in the seventh and eighth oscillation periods, like nodes 1 and 2 of the second hierarchical calculator 44 in FIG. 8A, bypass nodes again acquire a time slot in order. Thus, in accordance with the order prescribed by a phase relationship between nodes formed in the second hierarchical calculator 44, only bypass nodes acquire a time slot in order.

In the alternative embodiment, as mentioned above, as to the time slot allocation in the time period 104 from the time $t=t_0+W_{i2}$ to time $t=t_0+T_{i2}$, a plurality of bypass nodes acquire a time slot in order in units of the oscillation period $T_{i1}$ of the first hierarchical calculator 42. In the preceding embodiment, a time slot in the time period $W_{i2}$ is acquired in units of $W_{i2}=T_{i2}/p_2=nT_{i1}$, but when time slots are required to be allocated to a plurality of bypass nodes at smaller time intervals $T_{i1}$, the alternative embodiment is more advantageous than the preceding embodiment.

As with the preceding embodiment, by making the parameter $\tau$ variable, the alternative embodiment is also able to variously control the ratio of the time period 102 in which all nodes within an interaction range acquire a time slot and the time period 104 in which only bypass nodes acquire time slots. Thus, according to the present invention, it is possible to realize time-slot allocation that has various multiplexed time structures so as to meet requirements of various applications.

The present invention is specifically featured by the acquisition and control of communication timing information that is the phase signal in the illustrative embodiments and does not care how this timing information is used in communication. For instance, when nodes transmit data signals at difference frequencies, they may communicate with one another without setting time slots, but even in this case, they may use communication timing information to determine when to initiate data communication.

The aforementioned five prior art documents, which are pertinent to the present invention, disclose many variations. Among them, variations that are applicable to the present invention are intended to be included within the scope of the present invention.

In the illustrative embodiments, normal nodes enable a telecommunications system for unequal time-slot allocation and another telecommunications system for approximately equal time-slot allocation to exist together within networks.

Moreover, if time-slot allocation is implemented in a form in which bypass nodes preferentially transmit a large quantity of data occurring locally, then approximately equal time-slot allocation is realized in the area of a normal node group spatially away from the bypass node group. Therefore, significantly efficient communication is implemented which is capable of coping with and being adapted to the circumstances in which traffic from each node within a network differs greatly.

The entire disclosure of Japanese patent application No. 2006-170485 filed on Jun. 20, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A communication control apparatus installed in a communication node in a telecommunications system, the telecommunications system being formed by a plurality of communication nodes including a first node group of bypass nodes disposed in a first area and having a high quantitative request to relay data, and a second node group of non-bypass nodes disposed in second areas surrounding the first area and having a lower quantitative request to relay data than the first node group, said apparatus comprising:

a signal receiver for receiving a first state variable signal from a neighboring node of the plurality of communication nodes which is in a vicinity of the communication node in which said apparatus is installed, the first state variable signal indicating a timing of data transmission from the neighboring node;

a calculator for varying a plurality of phase signals different in oscillation period in response to the first state variable signal received from the neighboring node, synchronizing states of the phase signals so that the phase signals interact with each other, and temporally multiplexing, within an oscillation period of one of the phase signals, a plurality of data transmission periods different in time slot width and representing a transmission time period between the communication node in which said apparatus is installed and the neighboring node based on oscillation periods of the phase signals to thereby form a communication timing; and a signal transmitter for transmitting a second state variable signal defining a timing of data transmission from the communication node in which said apparatus is installed based on one of the phase states of the phase signals caused to interact with each other by said calculator;

said calculator comprising a state manager for managing states of phase signals for the communication node in which said apparatus is installed and the neighboring node different in oscillation period, and for prescribing an order relationship of time-slot allocation.

2. The apparatus in accordance with claim 1, wherein said calculator comprises a first calculator for forming different phase signals at a first hierarchy, and a second calculator for forming different phase signals at a second hierarchy;

said state manager dividing a first time period, in which a phase of the second node group in said second calculator advances from one particular phase to another particular phase, into second time periods by an oscillation period of the phase signal formed in said first calculator; allocating one of the second time periods as time slots indicating a transmission time period according to a phase relationship in said first calculator; allocating remaining ones of the second time periods as the time slots according to an order prescribed by a phase relationship in said second calculator; and variably controlling a ratio of the one second time period to the remaining second time periods.

3. The apparatus in accordance with claim 1, wherein said calculator comprises a first calculator for forming different phase signals at a first hierarchy, and a second calculator for forming different phase signals at a second hierarchy;

said state manager dividing a first time period, in which a phase of the first node group in said second calculator advances from one particular phase to another particular phase, into second time periods by an oscillation period of the phase signal formed in said first calculator; and allocating the second time periods as time slots indicating a transmission time period according to an order prescribed by a phase relationship in said second calculator.

4. The apparatus in accordance with claim 2, wherein said state manager divides a first time period, in which a phase of the first node group in said second calculator advances from one particular phase to another particular phase, into second time periods by an oscillation period of the phase signal formed in said first calculator, and allocates the second time periods as the time slots according to an order prescribed by a phase relationship in said second calculator.

5. A communication node in a telecommunications system formed by a plurality of communication nodes, the plurality of communication nodes including a first node group of bypass nodes disposed in a first area and having a high quantitative request to relay data, and a second node group of non-bypass nodes disposed in second areas surrounding the first area and having a lower quantitative request to relay data than the first node group, said communication node comprising:

a signal receiver for receiving a first state variable signal from a neighboring node of the plurality of communication nodes which is in a vicinity of said communication node, the first state variable signal indicating a timing of data transmission from the neighboring node;

a calculator for varying a plurality of phase signals different in oscillation period in response to the first state variable signal received from the neighboring node, synchronizing states of the phase signals so that the phase signals interact with each other, and temporally multiplexing, within an oscillation period of one of the phase signals, a plurality of data transmission periods different in time slot width and representing a transmission time period between said communication node and the neighboring node based on oscillation periods of the phase signals to thereby form a communication timing; and a signal transmitter for transmitting a second state variable signal defining a timing of data transmission from said communication node based on one of the phase states of the phase signals caused to interact with each other by said calculator;

said calculator comprising a state manager for managing states of phase signals for said communication node and the neighboring node different in oscillation period, and for prescribing an order relationship of time-slot allocation.

6. The node in accordance with claim 5, wherein said calculator comprises a first calculator for forming different phase signals at a first hierarchy, and a second calculator for forming different phase signals at a second hierarchy;

said slate manager dividing a first time period, in which a phase of the second node group in said second calculator advances from one particular phase to another particular phase, into second time periods by an oscillation period of the phase signal formed in said first calculator; allocating one of the second time periods as time slots indicating a transmission time period according to a phase relationship in said first calculator; allocating remaining ones of the second time periods as the time slots according to an order prescribed by a phase relationship in said second calculator; and variably controlling a ratio of the one second time period to the remaining second time periods.

7. The node in accordance with claim 5, wherein said calculator comprises a first calculator for forming different phase signals at a first hierarchy, and a second calculator for forming different phase signals at a second hierarchy;

said state manager dividing a first time period, in which a phase of the first node group in said second calculator advances from one particular phase to another particular phase, into second time periods by an oscillation period of the phase signal formed in said first calculator; and allocating the second time periods as time slots indicating a transmission time period according to an order prescribed by a phase relationship in said second calculator.

8. The node in accordance with claim 6, wherein
said state manager divides a first time period, in which a phase of the first node group in said second calculator advances from one particular phase to another particular phase, into second time periods by an oscillation period of the phase signal formed in said first calculator, and allocates the second time periods as the time slots according to an order prescribed by a phase relationship in said second calculator.

9. A telecommunications system including a first node group of bypass communication nodes disposed in a first area and having a high quantitative request to relay data, and a second node group of non-bypass communication nodes disposed in second areas surrounding the first area and having a lower quantitative request to relay data than the first node group, each of said bypass and non-bypass communication nodes comprising:
a signal receiver for receiving a first state variable signal from a neighboring node which is in a vicinity of said communication node, the first state variable signal indicating a timing of data transmission from the neighboring node;
a calculator for varying a plurality of phase signals different in oscillation period in response to the first state variable signal received from the neighboring node, synchronizing states of the phase signals so that the phase signals interact with each other, and temporally multiplexing, within an oscillation period of one of the phase signals, a plurality of data transmission periods different in time slot width and representing a transmission time period between said communication node and the neighboring node based on oscillation periods of the phase signals to thereby form a communication timing; and
a signal transmitter for transmitting a second state variable signal defining a timing of data transmission from said communication node based on one of the phase states of the phase signals caused to interact with each other by said calculator;
said calculator comprising a state manager for managing states of phase signals for said communication node and the neighboring node different in oscillation period, and for prescribing an order relationship of time-slot allocation.

10. The telecommunications system in accordance with claim 9, wherein said calculator comprises a first calculator for forming different phase signals at a first hierarchy, and a second calculator for forming different phase signals at a second hierarchy;
said state manager dividing a first time period, in which a phase of the second node group in said second calculator advances from one particular phase to another particular phase, into second time periods by an oscillation period of the phase signal formed in said first calculator; allocating one of the second time periods as time slots indicating a transmission time period according to a phase relationship in said first calculator; allocating remaining ones of the second time periods as the time slots according to an order prescribed by a phase relationship in said second calculator; and variably controlling a ratio of the one second time period to the remaining second time periods.

11. The telecommunications system in accordance with claim 9, wherein said calculator comprises a first calculator for forming different phase signals at a first hierarchy, and a second calculator for forming different phase signals at a second hierarchy;
said state manager dividing a first time period, in which a phase of the first node group in said second calculator advances from one particular phase to another particular phase, into second time periods by an oscillation period of the phase signal formed in said first calculator; and allocating the second time periods as time slots indicating a transmission time period according to an order prescribed by a phase relationship in said second calculator.

12. The telecommunications system in accordance with claim 10, wherein
said state manager divides a first time period, in which a phase of the first node group in said second calculator advances from one particular phase to another particular phase, into second time periods by an oscillation period of the phase signal formed in said first calculator, and allocates the second time periods as the time slots according to an order prescribed by a phase relationship in said second calculator.

13. A communication control method of controlling transmission in a communication node in a telecommunications system, the telecommunications system being formed by a plurality of communication nodes including a first node group of bypass nodes disposed in a first area and having a high quantitative request to relay data, and a second node group of non-bypass nodes disposed in second areas surrounding the first area and having a lower quantitative request to relay data than the first node group, said method comprising the steps of:
receiving a first state variable signal indicating a timing of data transmission from a neighboring node of the plurality of communication nodes which is in a vicinity of the communication node;
varying a plurality of phase signals different in oscillation period in response to the received first state variable signal, synchronizing states of the phase signals so that the phase signals interact with each other, and temporally multiplexing, within an oscillation period of one of the phase signals, a plurality of data transmission periods different in time slot width and representing a transmission time period between the communication node and the neighboring node based on oscillation periods of the phase signals to thereby form a communication timing;
managing states of phase signals for the communication node and the neighboring node different in oscillation period and prescribing an order relationship of time-slot allocation; and
transmitting a second state variable signal defining a timing of data transmission from the communication node based on one of the phase states of the phase signals caused to interact with each other.

* * * * *